United States Patent [19]

Bridges et al.

[11] Patent Number: 5,664,911
[45] Date of Patent: Sep. 9, 1997

[54] METHOD AND APPARATUS FOR IN SITU DECONTAMINATION OF A SITE CONTAMINATED WITH A VOLATILE MATERIAL

[75] Inventors: Jack E. Bridges, Park Ridge; Guggilam C. Sresty, Burbank; Harsh Dev, Chicago, all of Ill.

[73] Assignee: IIT Research Institute, Chicago, Ill.

[21] Appl. No.: 685,224

[22] Filed: Jul. 23, 1996

Related U.S. Application Data

[63] Continuation of Ser. No. 343,614, Nov. 22, 1994, abandoned, which is a continuation of Ser. No. 208,805, Mar. 9, 1994, abandoned, which is a continuation of Ser. No. 792, Jan. 4, 1993, abandoned, which is a continuation of Ser. No. 695,802, May 3, 1991, abandoned.

[51] Int. Cl.$^6$ .................. B09B 3/00; A62D 3/00
[52] U.S. Cl. .................. 405/128; 405/258; 588/253
[58] Field of Search ............... 405/128, 129, 405/131, 258; 166/248; 588/252, 253

[56] References Cited

U.S. PATENT DOCUMENTS

| | | | |
|---|---|---|---|
| Re. 30,738 | 9/1981 | Bridges et al. | 166/248 |
| Re. 33,102 | 10/1989 | Visser et al. | 166/267 |
| 166,357 | 8/1875 | Gray . | |
| 260,803 | 7/1882 | Tichenor . | |
| 746,096 | 12/1903 | Karsch . | |
| 825,745 | 7/1906 | Mitchell . | |
| 1,286,666 | 12/1918 | Layne . | |
| 1,512,125 | 10/1924 | Mende . | |
| 1,602,190 | 10/1926 | Eddy et al. . | |
| 1,715,970 | 6/1929 | Williams . | |
| 1,877,915 | 9/1932 | Lewis . | |
| 1,966,760 | 7/1934 | Irvine | 94/22 |
| 1,993,642 | 3/1935 | Aarts et al. | 244/1 |
| 2,099,328 | 11/1937 | Casagrande | 204/1 |
| 2,104,327 | 1/1938 | Kotzebue | 166/21 |
| 2,180,400 | 11/1939 | Coberly | 103/46 |
| 2,308,860 | 1/1943 | Clark | 255/1 |
| 2,375,865 | 5/1945 | Nebolsine | 166/1 |
| 2,385,298 | 9/1945 | Muskat | 166/1 |
| 2,434,239 | 1/1948 | Zublin | 166/26 |
| 2,508,949 | 5/1950 | Howard | 262/34 |
| 2,518,292 | 8/1950 | De Anglis | 182/2 |
| 2,624,410 | 1/1953 | Nixon | 166/2 |
| 2,740,476 | 4/1956 | D'Audiffret et al. | 166/46 |
| 2,765,850 | 10/1956 | Allen | 166/39 |
| 2,795,279 | 6/1957 | Sarapuu | 166/11 |
| 2,806,818 | 9/1957 | Howard | 204/180 |
| 2,927,640 | 3/1960 | Kenneday | 166/51 |
| 3,140,986 | 7/1964 | Hubbard | 202/52 |

(List continued on next page.)

FOREIGN PATENT DOCUMENTS

| | | |
|---|---|---|
| 1 166 151 | 4/1984 | Canada . |
| 1 320 921 | 2/1963 | France . |

(List continued on next page.)

OTHER PUBLICATIONS

Agrelot, et al., "Vacuum: Defense System For Ground Water Voc Contamination", pp. 1–10.

Bailey, et al., "In Situ Vapor Stripping of Contaminated Soils: A Pilot Study", pp. 207–220.

*Primary Examiner*—Dennis L. Taylor
*Attorney, Agent, or Firm*—Fitch, Even, Tabin & Flannery

[57] ABSTRACT

A method for removing a contaminant from a treatment region of a contaminated region of a site in the earth having water therein and being contaminated with the contaminant includes heating the earth by establishing an electric field through the treatment region. The electric field gives rise to an electric conduction or displacement current through the treatment region. The electric current electrically heats at least a portion of the treatment region to a temperature below the boiling point of water to evaporate the water. A vacuum is drawn in a nether region of the site to collect water vapor evolved from the water and contaminant vapor evolved from the contaminant by movement of air from the surface of the earth, while the water vapor strips the contaminant from the earth. The contaminant vapor is disposed of in an innocuous manner.

20 Claims, 16 Drawing Sheets

U.S. PATENT DOCUMENTS

| | | | |
|---|---|---|---|
| 3,169,577 | 2/1965 | Sarapuu | 166/42 |
| 3,208,674 | 9/1965 | Bailey | 241/1 |
| 3,234,879 | 2/1966 | Brown | 103/1 |
| 3,261,401 | 7/1966 | Karr | 166/50 |
| 3,277,962 | 10/1966 | Flickinger et al. | 166/15 |
| 3,417,823 | 12/1968 | Faris | 166/45 |
| 3,443,051 | 5/1969 | Puschner | 219/10.55 |
| 3,586,624 | 6/1971 | Larson | 210/3 |
| 3,601,448 | 8/1971 | Stone | 299/14 |
| 3,705,851 | 12/1972 | Brauer | 210/1 |
| 3,732,697 | 5/1973 | Dickson | 61/35 |
| 3,735,815 | 5/1973 | Myers | 166/313 |
| 3,765,483 | 10/1973 | Vencil | 166/265 |
| 3,866,255 | 2/1975 | Serota | 34/1 |
| 3,930,538 | 1/1976 | Brennan et al. | 166/205 |
| 3,972,372 | 8/1976 | Fisher et al. | 166/248 |
| 3,988,036 | 10/1976 | Fisher et al. | 299/5 |
| 4,014,387 | 3/1977 | Fink | 166/314 |
| 4,026,355 | 5/1977 | Johnson et al. | 166/246 |
| 4,094,809 | 6/1978 | Ross | 252/301.1 |
| 4,097,401 | 6/1978 | Guber et al. | 252/301.1 |
| 4,119,561 | 10/1978 | Drobnik et al. | 252/301.1 |
| 4,124,483 | 11/1978 | Christenson | 204/299 R |
| 4,139,488 | 2/1979 | Knotik et al. | 252/301.1 |
| 4,140,180 | 2/1979 | Bridges et al. | 166/248 |
| 4,144,935 | 3/1979 | Bridges et al. | 166/248 |
| 4,167,973 | 9/1979 | Forte et al. | 166/267 |
| 4,183,407 | 1/1980 | Knopik | 166/314 |
| 4,196,329 | 4/1980 | Rowland et al. | 219/10.81 |
| 4,278,502 | 7/1981 | Stevens et al. | 202/206 |
| 4,296,298 | 10/1981 | MacMaster et al. | 219/10.81 |
| 4,303,123 | 12/1981 | Freel et al. | 166/266 |
| 4,323,122 | 4/1982 | Knopik | 166/267 |
| 4,344,722 | 8/1982 | Blais | 405/270 |
| 4,366,846 | 1/1983 | Curati, Jr. | 141/1 |
| 4,369,839 | 1/1983 | Freeman et al. | 166/53 |
| 4,376,033 | 3/1983 | Calderon | 208/11 R |
| 4,376,598 | 3/1983 | Brouns et al. | 405/258 |
| 4,384,613 | 5/1983 | Owen et al. | 166/256 |
| 4,396,402 | 8/1983 | Ghosh | 48/197 A |
| 4,401,569 | 8/1983 | Jhaveri et al. | 210/610 |
| 4,424,149 | 1/1984 | Bege et al. | 252/629 |
| 4,442,901 | 4/1984 | Zison | 166/369 |
| 4,449,585 | 5/1984 | Bridges et al. | 166/248 |
| 4,469,176 | 9/1984 | Zison et al. | 166/250 |
| 4,476,926 | 10/1984 | Bridges et al. | 166/248 |
| 4,485,868 | 12/1984 | Sresty et al. | 166/248 |
| 4,485,869 | 12/1984 | Sresty et al. | 166/248 |
| 4,487,054 | 12/1984 | Zison | 73/19 |
| 4,498,535 | 2/1985 | Bridges | 166/248 |
| 4,518,399 | 5/1985 | Croskell et al. | 55/16 |
| 4,524,827 | 6/1985 | Bridges et al. | 166/248 |
| 4,527,633 | 7/1985 | McLaughlin et al. | 166/370 |
| 4,545,435 | 10/1985 | Bridges et al. | 166/248 |
| 4,579,391 | 4/1986 | Mouat et al. | 299/6 |
| 4,581,163 | 4/1986 | Meininger et al. | 252/633 |
| 4,590,348 | 5/1986 | Lahti et al. | 405/131 X |
| 4,593,760 | 6/1986 | Visser et al. | 166/267 |
| 4,611,950 | 9/1986 | Russomano | 405/128 |
| 4,624,319 | 11/1986 | Van Der Borght | 166/369 |
| 4,625,801 | 12/1986 | McLaughlin et al. | 166/267 |
| 4,645,004 | 2/1987 | Bridges et al. | 166/248 |
| 4,651,825 | 3/1987 | Wilson | 166/245 |
| 4,660,639 | 4/1987 | Visser et al. | 166/267 |
| 4,670,148 | 6/1987 | Schneider | 210/603 |
| 4,670,634 | 6/1987 | Bridges et al. | 219/10.41 |
| 4,697,532 | 10/1987 | Furukawa et al. | 110/346 |
| 4,730,672 | 3/1988 | Payne | 166/266 |
| 4,790,375 | 12/1988 | Bridges et al. | 166/60 |
| 4,793,409 | 12/1988 | Bridges et al. | 166/57 |
| 4,821,798 | 4/1989 | Bridges et al. | 166/60 |
| 4,858,704 | 8/1989 | McDonald et al. | 175/61 |
| 4,886,118 | 12/1989 | Van Meurs et al. | 166/245 |
| 4,900,196 | 2/1990 | Bridges | 405/267 |
| 4,945,988 | 8/1990 | Payne et al. | 166/266 |
| 4,951,748 | 8/1990 | Gill et al. | 166/248 |
| 4,957,164 | 9/1990 | Roark | 166/263 |
| 4,957,393 | 9/1990 | Buelt et al. | 405/128 |
| 4,973,811 | 11/1990 | Bass | 219/10.57 |
| 5,011,329 | 4/1991 | Nelson et al. | 405/128 |
| 5,018,576 | 5/1991 | Udell et al. | 405/131 X |
| 5,076,727 | 12/1991 | Johnson et al. | 405/128 |

FOREIGN PATENT DOCUMENTS

| | | |
|---|---|---|
| 1 059 846 | 6/1959 | Germany . |
| 692933 | 10/1979 | U.S.S.R. . |
| 927898 | 5/1982 | U.S.S.R. . |
| 1004528 | 3/1983 | U.S.S.R. . |
| 1139799 | 2/1985 | U.S.S.R. . |

Clarke, et al., "A Phased Approach to the Development of In Situ Vapor Stripping Treatment", pp. 191–193.

Dev, H., "Harsh Frequency Enhanced In–Situ Decontamination of Soils Contaminated With Halogenated Hydrocarbons".

Dev, et al., "Decontamination of Hazardous Waste Substances From Spills and Uncontrolled Waste Sites By Radio Frequency In Situ Heating", pp. 57–64.

Dev, et al., "Field Test of the Radio Frequency in Situ Soil Decontamination Process".

Dev, et al., "Zapping Hazwastes", Civil Engineering, pp. 43–45 (Aug., 1988).

Dev, et al., "In Situ Radio Frequency Heating Process For Decontamination of Soil" Chapter 27, ACS Symposium Series 338, Solving Hazardous Wste Problems, Learning from Dioxins, pp. 332–339 (1986).

Karlsson, et al., "New Horizontal Wellbore system for Monitor and Remedial Wells" Superfund '90 Hazardous Materials Control Research Institute, Contaminated Groundwater Control & Wells Types, pp. 357–362 (1990).

Langseth, "Hydraulic Performance of Horizontal Wells," Superfund '90 Hazardous Materials Control Research Institute, Contaminated Groundwater Control & Wells Types, pp. 398–408 (1990).

Wilson, "Mathematical Modeling of In Situ Vapor Stripping of Contaminated Soils" p. 194–206.

"Ground Contamination Removal system", Upjohn Technology For Trade, License Or Sale (Juen 21, 1985).

"New Waste Site Decontamination Method Proves Successful in Field Test", IIT Research Institute News Release dated Jun. 29, 1988.

4th Annual Hazardous Waste Exhibition Directory & Conference Guide, Expo '87/Chicago, Hyatt Regency/O'Hare Expo Center, Rosemont, Illinois, Oct. 19–22, 1987, pp. 1–48.

Kurlansky, "Unexplained Toxins Haunt Puerto Rico", Chicago Tribune, Thursday, Mar. 8, 1990, Section 1A, p. 23.

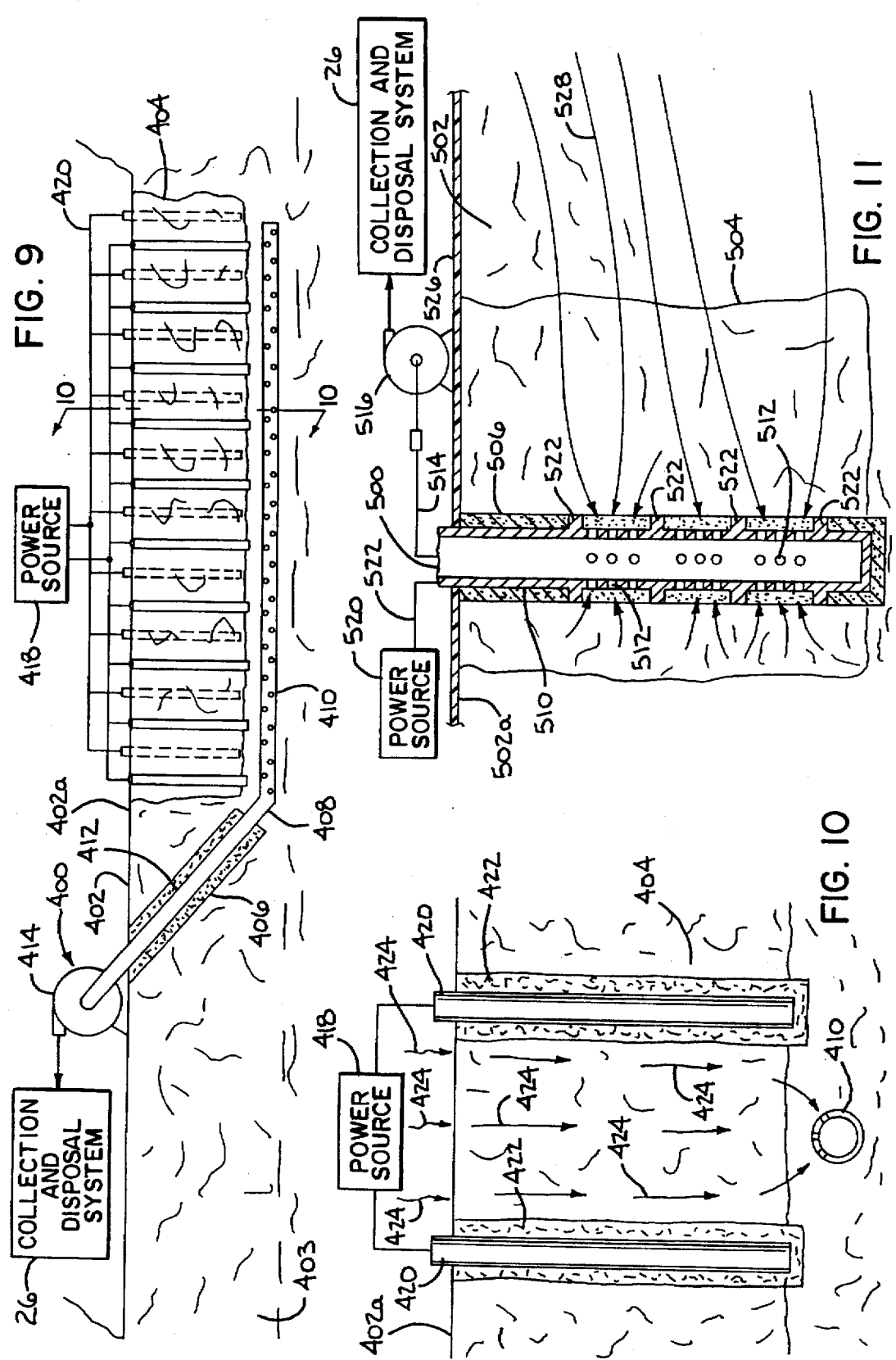

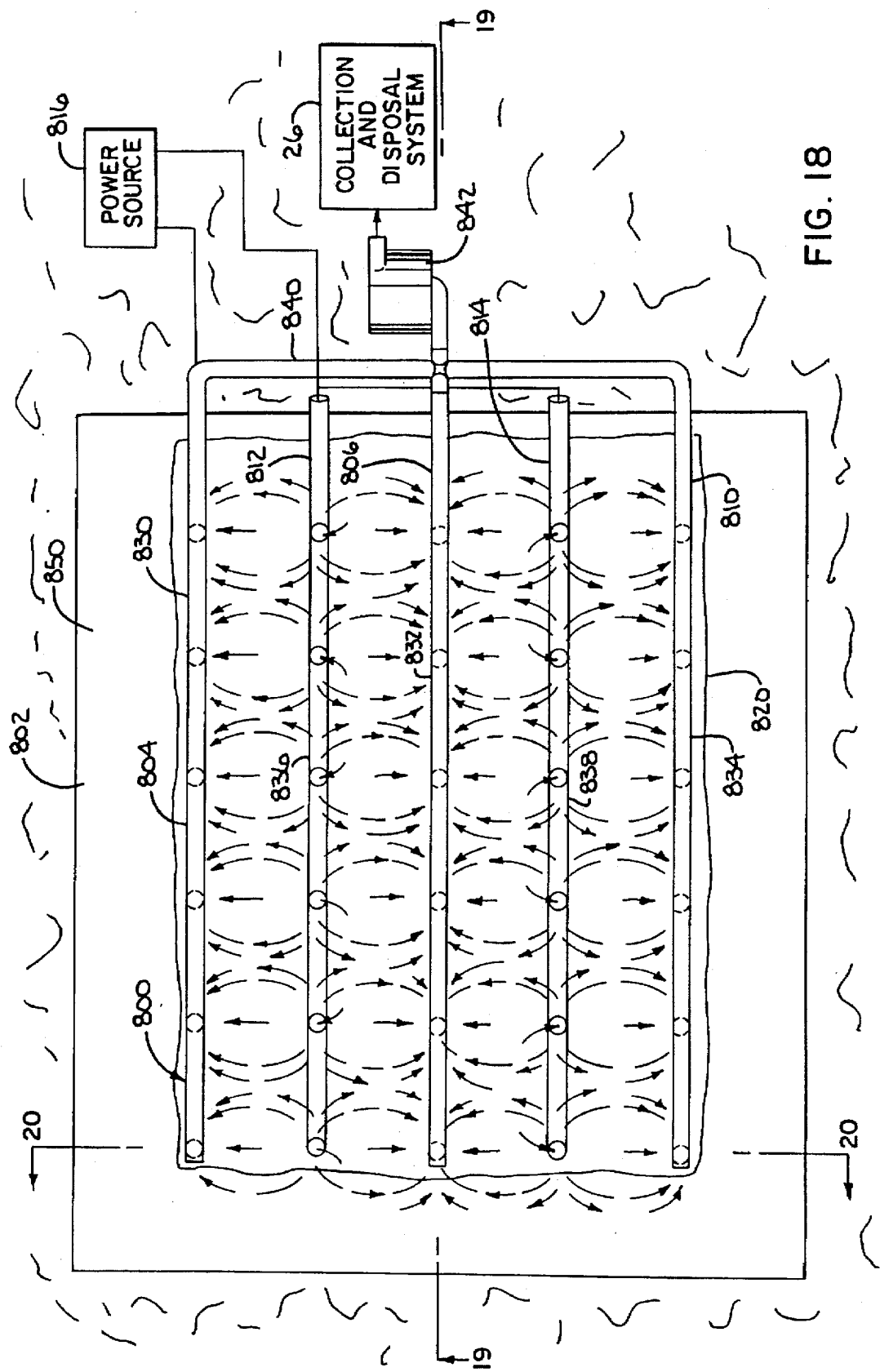

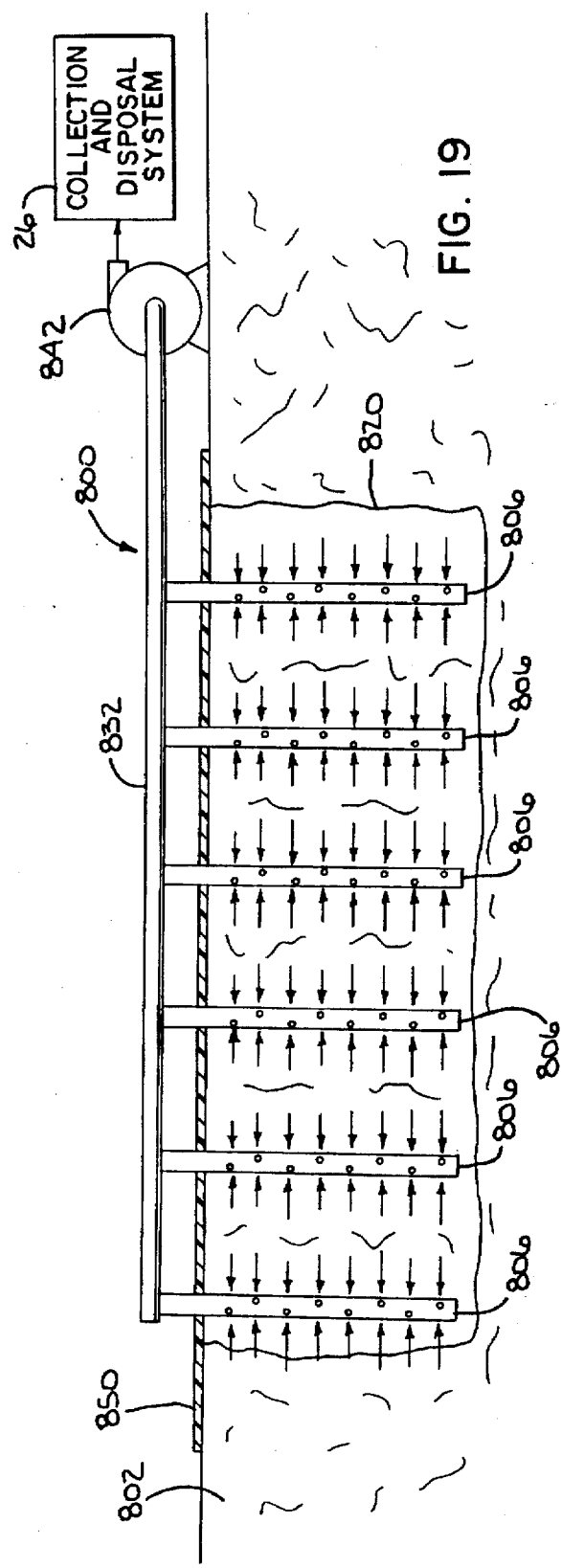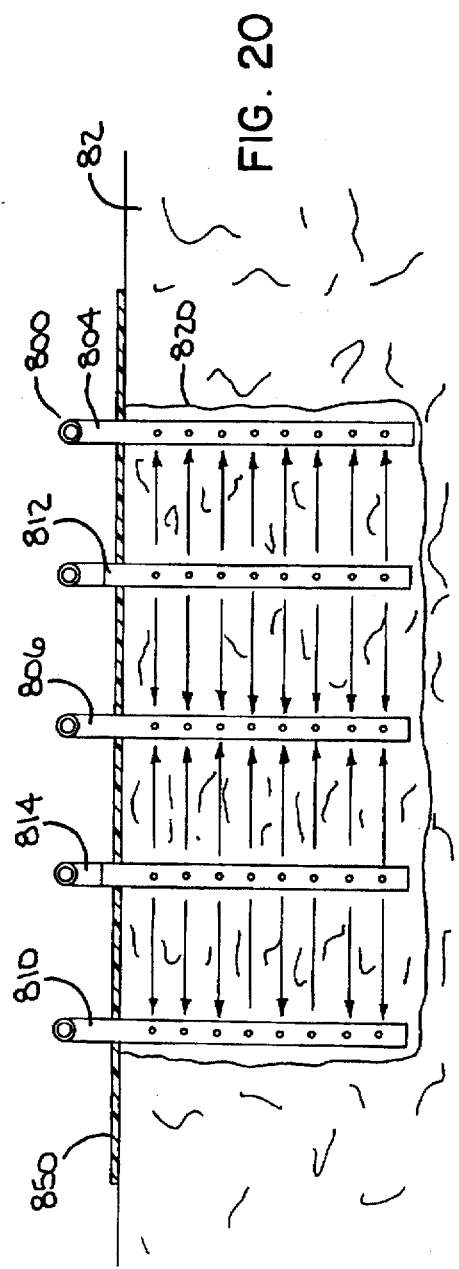

METHOD AND APPARATUS FOR IN SITU DECONTAMINATION OF A SITE CONTAMINATED WITH A VOLATILE MATERIAL

This application is a continuation of application Ser. No. 08/343,614, filed Nov. 22, 1994, which is a continuation application of Ser. No. 08/208,805, filed Mar. 9, 1994, which is a continuation application of Ser. No. 08/000,792, filed Jan. 4, 1993, which is a continuation application of Ser. No. 07/695,802 filed May 3, 1991, all abandoned.

BACKGROUND OF THE INVENTION

The invention relates generally to a method of and an apparatus for removing volatile and semi-volatile contaminants from a contaminated site in the earth and, more particularly, relates to a method of and an apparatus for removing volatile and semi-volatile contaminants from the earth by heating a portion of the contaminated earth by electromagnetic energy. The heated contaminated site is swept by air in a controlled manner to avoid interrupting the electromagnetic heating, to avoid fugitive emissions of contaminants to the atmosphere and to provide an air-contaminant vapor-water vapor mixture having a relatively high concentration of contaminant vapor easily adsorbed by a carbon bed or the like. An economic and efficient removal of the contaminants is achieved.

In recent years the public and the government have come to recognize that small amounts of various organic materials that have been spilled or improperly disposed of at various sites are environmental hazards and must be cleaned up. In the past, cleanup operations required that the entire site be excavated and that the soil and other site materials contaminated with unwanted or dangerous materials, such as hydrocarbons, halocarbons, and the like, had to have substantially all the contaminating material removed from them. In a typical prior art decontamination method, the entire site is excavated and all the excavated site materials are burned in a portable incinerator. Such a method is costly if the site is extensive, and may be impractical due to the large volume of contaminated soil if the contaminated site is deep.

Another method, as disclosed in U.S. Pat. No. 4,670,634 to Bridges, et al., treats a contaminated site by heating it with radio frequency energy. A plurality of fringing field electrodes is electrically excited by a radio frequency current to produce a bound, fringing, time-varying electric field that dielectrically heats portions of the contaminated site located below the electrodes. Volatile contaminants trapped in the site are volatilized or distilled and create sufficient autogenous pressure that they can be vented from the site surface into a chamber confined by a tent-like vapor barrier over the site. As may best be seen in FIGS. 1 and 3 of Bridges, et al., vapor exiting the ground is collected beneath the tent-like vapor barrier and carried by a vapor and gas collection line 34 to an external gas-liquid separator. In an alternative embodiment, as may best be seen in FIG. 7 of Bridges, et al., gravel is placed on the site surface in two layers. A plurality of gas and vapor collection ducts 68 is buried in the lower level of the gravel for carrying evolved contaminant vapors away from the site to treatment apparatus. The lower gravel layer, with the collection ducts positioned therein, is covered by an impermeable vapor barrier and the impermeable vapor barrier is overlaid by the upper gravel layer. The fringing field electrodes are positioned above the upper gravel layer substantially free from contact with it.

A similar system is disclosed in H. Der, et al., "In Situ Radio Frequency Heating Process for Decontamination of Soil," *Solving Hazardous Waste Problems*, presented at the 191st Meeting of the American Chemical Society, Apr. 18, 1986. The Dev, et al. system includes fringing field electrodes covered by the tent-like vapor barrier. Der, et al. also disclose that a site may be heated by radio frequency energy supplied by tubular vertical electrodes in boreholes, or by horizontal electrodes positioned above the surface of the soil to be heated. The electrodes are energized by a source of electrical energy producing an electric current having a frequency in the range of 6 MHz to 13 MHz. Transport of vaporized volatile contaminant to the collection region from the site is effected solely by the vapor pressure of the heated volatile contaminant and evolved water vapor. Dev, et al. disclose experimentation with small batches of sandy soil to determine the feasibility of removing chlorinated hydrocarbons, in particular tetrachloroethylene, from them. Dev et al. also discuss vacuum extraction technologies as alternatives for the Dev et al. system. The vacuum extraction technologies are directed to removing volatile contaminants from soil by drawing a vacuum inside or adjacent to the contaminated region of the site so that the contaminant is drawn out of the site.

In the methods described by Bridges, et al. and Dev, et al., it is necessary to heat the soil to a temperature sufficient to increase the vapor pressure of the contaminants to cause their volatilization and to overcome the pressure drop needed for movement of the volatilized contaminants through the contaminated earth to the collection region. Because the collection region is near the surface, it is not practical to draw a vacuum at the collection region greater than one inch on water gauge. As a result, pressures higher than atmospheric are generated in portions of the heated soil to overcome the pressure drop for movement of the volatilized contaminants from the region of volatilization to the collection region. Generation of such superatmospheric pressures may result in fugitive emissions of the volatilized contaminants from the earth's surface in regions not covered by the vapor-barrier, thereby contributing to air pollution.

As discussed above, vacuum or reduced pressure is used for in situ remediation of soils contaminated with hydrocarbons, such as solvents or fuels and is generally referred to as vacuum extraction technology, sometimes abbreviated as VET. A number of workers in the art are offering commercial remediation services based on this technology. The commercial methods and apparatus generally involve drilling a well into the vadose zone of the earth followed by the application of vacuum to volatilize and collect the contaminants. Multiple wells are sometimes used for large contaminated sites. Injection wells are used in combination with recovery wells in alternative methods. A common drawback is the inability to treat economically sites containing relatively less volatile materials, such as jet fuels.

U.S. Pat. No. 4,183,407 to Knopik discloses an underground exhaust system for removing vapors. The system employs a number of underground conduits inserted through an excavated shaft. A plurality of elongated and perforated collection elements connected to the conduits are buried in the contaminated site. An exhaust system for drawing gasoline vapors from the contaminated site is connected to the other end of the conduit. Such a system involves expensive shaft preparation, drilling of radial holes for conduits, and disposal of the excavated soil.

Visser and Malot U.S. Pat. Nos. 4,593,760 and 4,660,639 disclose vacuum extraction technology and well completion systems for decontamination of the vadose zone and for recovery of liquids trickling through the vadose zone. Their system effects vaporization, at ambient temperature, of the contaminants present in the vadose zone by applying sufficient vacuum. It is feasible to draw a vacuum sufficient to evaporate light solvents or volatiles, such as carbon tetrachloride or benzene, at ambient temperature. However, for most decontamination applications involving soils containing semi-volatiles or high boiling materials, such as jet fuels, the amount of vacuum needed for significant evaporation is relatively high. Visser and Malot depend upon putting a conduit in a larger borehole and completing it in such a way that the lower portion is filled with an permeable medium and the upper portion is filled with an impermeable medium. From practical considerations, the borehole cannot be larger than the conduit. This produces an annulus of limited dimensions.

Agrelot, Malot and Visser, Vacuum: *Defense System For Ground Water VOC Contamination* disclose use of a nearly complete vacuum, 29.9 inches of mercury, for sites contaminated with a light solvent such as carbon tetrachloride. Use of such a high vacuum, however, results in intrusion of large quantities of air through the soil and significant dilution of the contaminant vapor with air. The concentration of carbon tetrachloride in the air-carbon tetrachloride effluent is only about 2.7 per cent based upon the data of Agrelot, et al. Since carbon tetrachloride has a vapor pressure of over 100 millimeters of mercury at 25° C. if no air bypass has occurred, the concentration of carbon tetrachloride in the effluent is expected to be about 13 per cent based upon thermodynamic considerations. The Agrelot, et al. data show that almost 80 per cent of the total volume of air is bypassing, it is not directly participating in vaporization of the contaminants. Use of such a system for soils containing semi-volatile materials, such as jet fuel, diesel fuel, chlorinated phenols and biphenyls, polynuclear aromatics, and creosote with vapor pressures of one millimeter of mercury or less at room temperature will produce effluents containing only one to one hundred parts per million of contaminants. Treatment of the effluents containing such low concentrations of contaminants, including steps of extracting the low concentration contaminant vapors from the air and contaminant vapor mixture, is economically prohibitive. The quantity of air to be moved through the vacuum system to decontaminate a site also is very large, due to the large quantity of contaminant in a typical site and the low concentration of the contaminants in the effluent stream and bypassing. This makes such methods expensive for such applications.

U.S. Pat. No. 4,442,901 to Zison discloses an apparatus and method for recovering methane and other gases from a landfill by using shallow wells having a reduced pressure placed thereon. A gas barrier covers a portion of the site to prevent air from breaking through into the methane containing regions and induce flow of landfill gas into the collector from regions radially outward from the collector. The gas barrier may be a thin plastic sheet or a polymerized clay such as polymerized bentonite and may be coextensive with or extend radially outwardly beyond the collector.

U.S. Pat. No. 4,730,672 to Payne discloses a closed-loop system that treats contaminants by a combination of condensers, a carbon bed, and reinjection of the cleaned effluents back into the vadose zone under pressure. The method suffers from the same drawback as those discussed above because it produces dilute effluents and injects air under pressure into the vadose zone which may result in fugitive emissions.

Another major difficulty of some of the vacuum extraction systems of the foregoing systems, such as Zison, is that subsurface air flow patterns are inhibited or are subject to bypassing in the region of the collector. The bypassing subsurface air flow patterns have a quasi-cylindrical or spherical symmetry about vertical perforated collectors. Thus, at the more distant radial positions from the vertical collectors the air flow is low, whereas close to the perforated vertical collectors the air flow is large. This results in nonuniform decontamination, partly because air flow rate varies through the treatment region, but also because the absolute pressure varies greatly within the treatment region. Near the collector the pressure will be low enough to vaporize a wide spectrum of contaminants, whereas at the more distant points, the absolute pressure will be nearly atmospheric, resulting in incomplete decontamination at the volumes more distant from the collector.

Similarly to Visser et al., U.S. Pat. No. 4,957,393 to Buelt, et al. discloses a system that also is relatively inefficient. In one version Buelt, et al. require the air to be removed by vacuum at an opening at the bottom of each electrode. Such an arrangement causes air flow to bypass the main portion of the site being heated. Air flows directly from outside the processing area into the bottom parts of the electrodes which are located around the periphery of the area being processed. At the same time, the vapor pressures of the materials desired to be removed are increased to a point where they may escape into the atmosphere. In another version, Buelt, et al. suggest the use of a hood under a vacuum which is placed over the processing area. Again the system is such that air can bypass the contaminated region by flowing around the edges of the hood and not being drawn through the deposit being heated. In fact, the system proposed by Buelt, et al. does not rely on the use of an air sweep to dry out the deposit, but rather it depends on raising the temperature of the deposit to a point where the vapor pressures of the contaminants drive them out of the soil.

Buelt, et al. also heat the waste site to temperatures well above the boiling point of water, but less than the melting point of the soil constituents, for an extended period of time in order to volatilize contaminant material. Thus, Buelt, et al. rely upon heating the soil well above the boiling point of water to generate sufficient vapor pressure such that the contaminants are easily collected.

Such high temperatures have the advantage of being able to remove not only the semi-volatiles but also a substantial fraction of refractory compounds. However, the large amount of energy needed not only to boil the water off, but also to heat the deposit to a suitable temperature whereat the contaminants themselves are distilled, volatilized or pyrolyzed to generate sufficient pressure to cause their migration through the soil to the contaminant collection system is very expensive. The contaminants also may be forced from the contaminated region by steam drive. Steam distillation reduces the vapor pressure of the contaminant but at the expense of added equipment. However, such auxiliary procedures introduce further equipment complexity.

U.S. Pat. No. 4,973,811 to Bass discloses a decontamination system employing eddy current or induction heating of a contaminated site by an above ground RF transmission line 21 and connected electrodes 12 and 14 excited by a high RF current from a constant current RF source 20. A vapor barrier 24 confines the contaminant emissions from the site and is connected to ducts 22 to carry the contaminant vapor to a mobile treatment system 23. In order to prevent condensation of contaminant vapor above ground, sweep air is supplied over the site and a radiant surface 26 above the electrodes 12 and 14 may also be employed. When the site is dried the heating mode may be switched from induction heating to fringe field heating.

Bass requires a radio frequency generator for energization of the electrodes 12 and 14 in both the induction mode as water is being evaporated and the fringe field heating mode when the water has been driven off. Bass is effective only for treating relatively shallow contaminated regions due to the decrease in the eddy current density at deeper points of the site remote from the above electrodes 14 and 14. The Bass system also may release fugitive emissions from under the edges of the vapor barrier 24. Bass does not suggest the use of below ground vacuum or controlled air sweep to speed the vaporization of the contaminant.

U.S. Pat. No. 4,984,594 to Vinegar, et al. discloses an in situ method for removing contaminants from surface and near surface soil by imposing a vacuum on the soil and includes a surface heater energized from a source of low frequency electrical energy at a frequency of 60 Hz by means of a common bus line. A pumping manifold pipe is connected to a vacuum collection system 16 and is also coupled to a highly permeable mat 22 which serves as a conduit for flow beneath an impermeable sheet.

The Vinegar, et al. system suffers from the problem that vacuum extraction does not take place from deep in the earth, nor is there heating from in the earth. The system is only effective for removing materials from the very top of a contaminated soil surface.

SUMMARY OF THE INVENTION

According to the present invention, air flow through a site in the earth contaminated with a volatile or semi-volatile contaminant is controlled so as to reduce the costs of the air treatment system and to treat the contaminated site completely without areas of over or under treatment. Specifically, there is as uniform an air flow as possible. Such an air flow pattern differs from the type of fluid flow required for enhanced oil recovery wherein two different fluids, often of widely varying viscosity, mobility and relative immiscibility, occur in the deposit and the more mobile fluids, such as water, are used to push the less mobile oil into a production well.

The present invention overcomes the low vapor pressure limitation of prior art vacuum extraction methods by heating the soil of the treatment region in situ to an elevated temperature using conduction current or displacement current. Under these conditions, the system will not have to depend upon large quantities of air to effect vaporization of low vapor pressure substances. The amount of vacuum used in the practice of the present invention is relatively small and effective completion systems will overcome the second limitation of the uncontrolled air pathways that may bypass portions of the deposit. The third limitation is also overcome by heating since the increased vapor pressure causes the contaminant-to-air ratio to increase by an order of magnitude. Thus, the design of the completion system of the present invention for removal of contaminants minimizes air bypass, provides a high permeability path for collection of air containing the contaminants, and provides, insofar as possible a uniform air flow through the deposit by the use of extraction wells and tailored air infiltration regions.

The uniform flow of air may be realized in the practice of the present invention by the use of a horizontal drain positioned in or near the treatment region. Air at the surface of the earth is drawn vertically downward and flows more or less uniformly to the immediate vicinity of the drain from which a vacuum is drawn. In another embodiment of the present invention, uniform horizontal flow patterns of air are achieved by covering a portion of the surface of the earth with an impermeable sheet to limit the portions of the earth's surface through which air can flow. A plurality of effluent drain wells and a plurality of air injection wells arranged in a line drive of injection to produce a substantially uniform horizontal flow of air through the treatment region also may be employed.

The controlled flow referred to above is achieved by a structure that causes the air or gas entering the treatment region to enter all portions of the treatment region at substantially the same speed so that the entire treatment region will have contaminant extracted from its volume at substantially the same rate.

One apparatus which provides such controlled flow through the treatment region includes a plurality of vertical electrodes and a horizontal drain positioned beneath the vertical electrodes. The horizontal drain has a vacuum drawn on it by a vacuum pump or the like causing air to be drawn in through a ground surface, through the treatment region and into the drain. An impermeable sheet is placed immediately outside the periphery of the ground surface immediately above the treatment zone so that air only enters the ground from directly above the treatment region. As a result, the air flows at a uniform speed along substantially straight line paths through the treatment region until it reaches the immediate vicinity of the drain. The air flow through the treatment region is at a substantially uniform speed, with the exception of the area immediately surrounding the drain. This controlled flow of air tends to avoid fingering of the air stream that could cause portions of the treatment region to be left with contaminant therein when other portions have been decontaminated.

Another treatment apparatus comprises vertical air injection wells and vertical air-contaminant-water extraction wells positioned in alternating lines. The air injection wells and the extraction wells may also have immediately associated with them electrodes. The electrodes produce an electric field strength in the treatment region. The air from the air injection wells travels horizontally through the treatment region and is picked up by the extraction wells. The air injection wells are aligned as are the extraction wells. There are alternating rows of air injection wells and extraction wells so that the air flow is substantially coincident with the electric field and is also at a substantially constant velocity, with the exception of the regions immediately surrounding the electrodes. This is in order to provide uniform treatment and to prevent the regions immediately adjacent the electrodes from being dried out, which may disturb the conduction current pattern if conduction or ohmic heating is being used.

A still further apparatus providing controlled flow has vertical extraction wells wherein an impermeable layer closes off the upper surface of the treatment region to cause air drawn by the extraction wells to be pulled in through the sides, rather than the ground surface, of the treatment region. The air entering the sides of the treatment region enters all sides of the treatment region with substantially the same speed to provide a controlled flow path for uniform treatment and to avoid fingering which may leave untreated patches in the treatment region.

In the practice of the present invention where contaminants, such as mercury, which have a high boiling temperature are present, the contaminated site is heated to a temperature below the boiling point of the contaminant and yet above the boiling of water by the use of the radio frequency or dielectric heating by displacement current while being swept with a substantially uniform air sweep.

The high boiling temperature contaminant is thereby carried to a collection region without the creation of new unwanted species of compounds by the excessively high temperatures which would be necessitated by the prior art systems. Moreover, the use of lower temperatures in combination with the substantially uniform air sweep reduces the energy required for the process, thereby decreasing costs.

The present invention is particularly directed to a method of and an apparatus for removing volatile and semi-volatile contaminants, such as gasoline and kerosene, from a contaminated site by the application of electromagnetic energy to elevate the temperature of the contaminated site sufficiently to increase the vapor pressure of all contaminants present within the heated contaminated earth while providing a controlled air flow through substantially all the earth. This avoids excessive removal of moisture near the electrodes when electrical conduction heating is employed. The contaminants are volatilized and transported to selected regions of the earth, where the effluents are collected and transported to an above ground system for their treatment and disposal. The method may be practiced by the emplacement in earth of a plurality of electrodes, oriented horizontally or vertically. Alternatively, in the case of dielectric heating above 100° C., some or all of the emplaced electrodes are used to create subatmospheric pressure within the contaminated earth, to cause controlled air flow through the earth, and to collect and transport the effluents from the earth to the treatment and disposal system.

In one embodiment of the invention, electromagnetic energy is applied to emplaced electrodes to heat the earth by conduction or ohmic heating. The earth can be heated to temperatures near the boiling point of water typically using commercial power frequencies of 50 or 60 Hz electric current. However, any frequency which is below 100 kHz and greater than 1 Hz and which is easily and economically generated is defined as a "power frequency" and can be used for conduction heating. The vapor pressure of many hydrocarbon contaminants, such as gasoline and jet fuel, is sufficiently high at temperatures near, but below 100° C. for their efficient removal with a controlled air flow through the earth. Certain hydrocarbon contaminants such as fuel oil, chlorinated phenols, and chlorinated biphenyls have vapor pressures on the order of one to ten millimeters of mercury at temperatures near 100° C. For such contaminants, it may be necessary to heat the earth using high frequency electromagnetic energy, such as 100 kHz to 100 MHz, to temperatures higher than 100° C. by displacement current or dielectric heating, in order to increase the vapor pressure of the contaminants to the order of ten to one hundred millimeters of mercury for their efficient collection with a controlled air flow.

The instant invention also may be practiced using a combination of low frequency and high frequency electromagnetic heating with the low frequency electromagnetic energy producing conduction current through the treatment region being used during the initial phase of heating to heat the earth to the boiling point of water and evaporate some of the water present therein, followed by high frequency electromagnetic energy producing displacement current through the treatment region to evaporate the remaining water and further heat the earth to temperatures above the boiling point of water.

Some of the electrodes emplaced in the earth can be used as extraction wells and others as air infiltration wells. For low frequency or conduction current heating, it is necessary to maintain the soil moist in the proximity of the electrodes in order to maintain an electrically conductive or low resistance path between the electrodes and the contaminated site. If some of the electrodes are used as air infiltration wells water or brine must be provided at the combination well and electrode locations because of the increase in resistance caused by enhanced evaporation and drying due to the low pressure and high current in the immediate vicinity of the combination well-electrodes. Hence, for the low frequency or conduction current embodiments of the invention, it is preferred that extraction and infiltration wells be separate from electrodes and separate flow paths be established for air and electromagnetic energy if water injection is not provided.

In the practice of the present invention extraction wells are emplaced in the contaminated earth either vertically or horizontally. A vacuum is drawn through the extraction wells creating a subatmospheric pressure zone in the belowground collection region of the site, resulting in a pressure gradient from the earth's surface to the collection region. The location and design of the air infiltration wells or regions results in a controlled flow of air at a substantially uniform speed through substantially all of the contaminated site. The contaminants are volatilized under the combined actions of the subatmospheric pressure and flowing air, transported from the contaminated zone to the collection region, and then through the extraction wells to the effluent treatment and disposal system, rather than escaping through the upper portion of the site into the atmosphere.

Because the electrodes extend below the surface of the site and contact the earth, whether they are oriented horizontally or vertically, they provide a spatially quasi-uniform, electrical current conduction heating region extending deep into the earth to heat the earth uniformly so that the entire contaminated volume is treated.

In addition, in the practice of the instant invention, a vapor barrier may be placed over substantial portions of the site to control the flow of air throughout the deposit. This causes air to interact completely with the soil via long flow paths and controls fugitive emissions. The vapor barrier also causes air to be drawn in from the sides or top of the site, providing a controlled path air sweep through the site to remove contaminants without having flow rates, in the case of conduction heating, at the electrode surfaces which might dry the earth in proximity with the electrodes and interrupt the electrical conduction heating. Because of the increased temperature, the relative concentration of the contaminant vapor due to increased vapor pressure in the contaminant-air mixture is high, allowing a substantial position of the contaminant to be removed by condensation of the contaminant-air mixture followed by final clean-up of the contaminant-air mixture by carbon adsorption beds and the like of the effluent treatment and disposal system located above the site and coupled to a vacuum pump. Water vapor present in the effluent stream is condensed simultaneously with the contaminant, and the mixed condensed phase is further separated to separate water and contaminant. The high contaminant vapor concentration results from the air only mixed with the contaminant vapor being drawn through the sides of the site by the vacuum, and not from directly above the surface of the site.

In the preceding description of the instant invention, controlled flow of air through the contaminated earth is described. Even though use of atmospheric air is the preferred method, in certain instances it may be more advantageous to introduce heated air or another fluid into the contaminated site. For instance, air may be preheated to approximately the same temperature as the contaminated earth or to a somewhat higher temperature to compensate for heat loss from the heated earth to the surroundings and to eliminate the need for continuous or intermittent deposition of electromagnetic energy to supply the heat required to increase the temperature of the flowing air from ambient atmospheric temperature to the ambient temperature of the contaminated earth. This is achieved by introducing preheated air into air infiltration wells. Air can be preheated by a number of means including CALROD electric resistance heaters, and gas and oil burners, and can be supplied to the air infiltration wells by insulated pipes or ducts. The pressure gradients generated within the contaminated site cause the flow of the heated air through the infiltration wells. Steam or hot water vapor is more effective than air in desorption of certain contaminants, such as polar compounds and polynuclear aromatics, from earth, in particular when clay is present in contaminated earth, due to the enhanced wetting of minerals by steam relative to air. Nitrogen and steam may be preferred over air in certain instances if the contaminated earth contains a large concentration of chlorinated phenols and biphenyls, and the earth is heated to temperatures higher than about 200° C. This prevents the oxidative formation of toxic compounds.

Certain inorganic contaminants having relatively high vapor pressures also can be removed using the instant invention. For example, certain inorganic compounds of antimony, arsenic, beryllium, bismuth, cesium, mercury, sulfur and zinc have vapor pressures in excess ten millimeters of mercury in the temperature range of 150° C. to 500° C., and can be removed from earth using the instant invention.

It is a principal aspect of the present invention to provide a method of and an apparatus for removal of volatile heavy fraction contaminants from a contaminated site.

It is another aspect of the instant invention to provide a method of and an apparatus for in situ decontamination of a site by a combination of heating and pressure reduction in a nether portion of the site.

It is an aspect of this invention to provide a controlled air flow pathway for air so as to process completely a portion of a contaminated deposit.

It is an aspect of this invention to further provide a controlled air flow pathway so as to avoid excessively depleting the moisture near electrodes where conduction heating is employed.

Further, it is an aspect to suppress fugitive emissions by proper control of the air flow pathway.

It is another aspect to recover both volatiles and semi-volatiles with simple, low cost apparatus that avoids the need to develop high deposit temperatures much in excess of 150° C.

It is another aspect of this invention to recover inorganic material that has a vapor pressure in excess of ten millimeters of mercury in the temperature range of 150° C. to 500° C.

It is a further aspect of the present invention to provide a method of and an apparatus for in situ decontamination of a site contaminated with a heavy volatile material by electrically heating water within the site so that when the pressure at the site is reduced in a subsurface collection region the heavy volatile material may be easily recovered.

It is a still further aspect of the present invention to provide a method of and an apparatus for in situ decontamination providing a contaminant rich contaminant-air stream for ready recovery of the contaminants by adsorption and the like.

Other aspects of the present invention will be apparent to one of ordinary skill in the art from the specification and claims in light of the accompanying drawings.

BRIEF DESCRIPTION OF THE DRAWINGS

FIG. 9 is a sectional view of a fourth decontamination system embodying the present invention;

FIG. 10 is a sectional view of the fourth decontamination system shown in FIG. 9 and taken generally along line 10—10 of FIG. 9;

FIG. 11 is a detailed sectional view of an electrode of a fifth decontamination system embodying the present invention showing details thereof;

FIG. 18 is an elevational view of an eighth decontamination system, embodying the present invention having a plurality of vertical extraction wells and vertical electrodes positioned in a contaminated region of the earth;

FIG. 19 is a sectional view of the eighth decontamination system shown in FIG. 18 and taken generally along line 19—19 thereof;

FIG. 20 is a sectional view of the eighth decontamination system shown in FIG. 18 and taken generally along line 20—20 thereof;

DETAILED DESCRIPTION OF THE PREFERRED EMBODIMENTS

Figure 1:
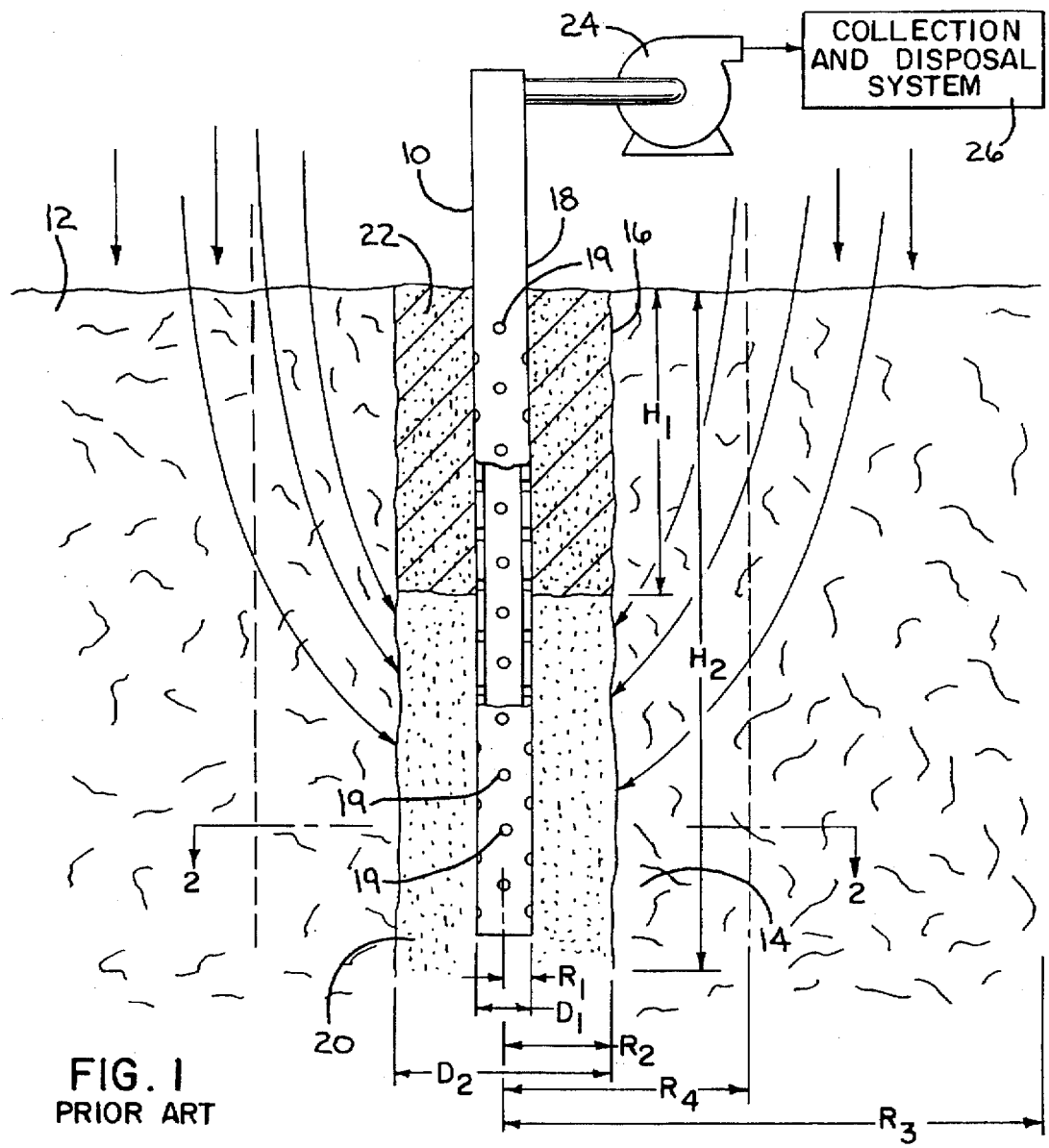
FIG. 1 is a sectional view of a prior art decontamination system.
Figure 2:
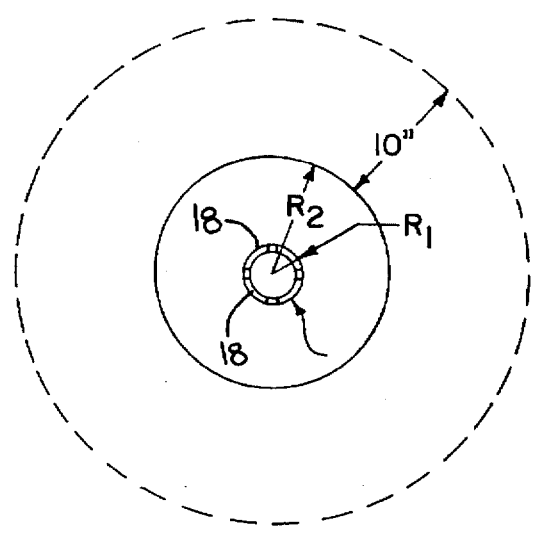
FIG. 2 is a sectional view of the prior art decontamination system shown in FIG. 1 and taken generally along line 2—2 of FIG. 1.
Figure 3:
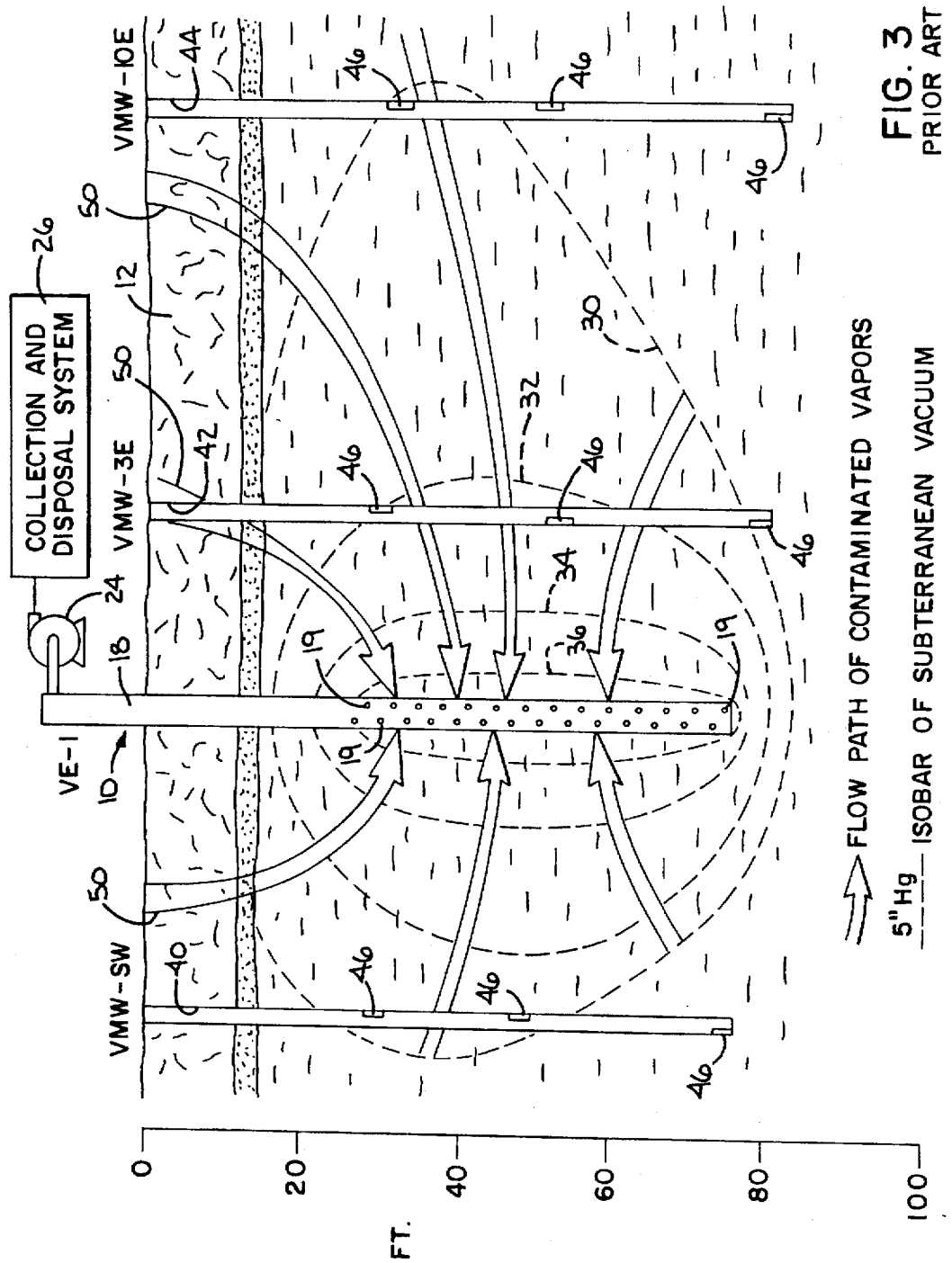
FIG. 3 is a sectional view of the prior art decontamination system shown in FIGS. 1 and 2 in operation in a contaminated site with air flow paths and isobars shown thereon.

Referring now to the drawings and especially to FIGS. 1 through 3, the prior art system of Visser, et al. is shown therein. The Visser, et al. system, which is generally identified by numeral 10 is used for extracting a contaminant from earth 12 at a treatment region 14 which is a portion of the vadose or above ground water zone of the earth which may be contaminated with a volatile contaminant such as carbon tetrachloride and the like. A well 16 is formed therein having a perforated vapor collection tube 18 in place therein. A permeable substance 20 is positioned in the well 16 surrounding a lower portion of the collection tube 18. An impermeable material 22 seals the upper portion of the well 16 in order to reduce fingering. The collection tube 18 has connected to it a vacuum pump 24 for drawing a vacuum through the collection site and a collection and disposal system 26 for further processing of an air-contaminant vapor stream drawn from the ground 12. A slightly different embodiment of the prior art system is shown in FIG. 3 wherein details of the impermeable material 22 and permeable material 20 are not included in the figure. The collection tube 18 having the plurality of collection apertures 19 is shown therein and in addition, a plurality of isobars are shown in dotted form with an isobar 30 representing the 1.5 inches of mercury line and isobar 32 representing the 2 inches of mercury line and isobar 34 delineating the 5 inches of mercury line and an isobar 36 delineating the 10 inches of mercury line. The various pressures may be measured by a plurality of measuring wells 40, 42 and 44, each having vacuum measuring devices 46 positioned at various points therein. It may be appreciated that due to the relatively small pressure differential, except along isobar 36 for 10 inches of mercury, appreciable vaporization of the contaminant in the ground will not take place due to reduction in the ambient pressure by the vacuum system. Thus, the vacuum system must rely primarily for removal of air flowing along air flow paths 50, primarily coming in from the surface of the site.

Figure 4:
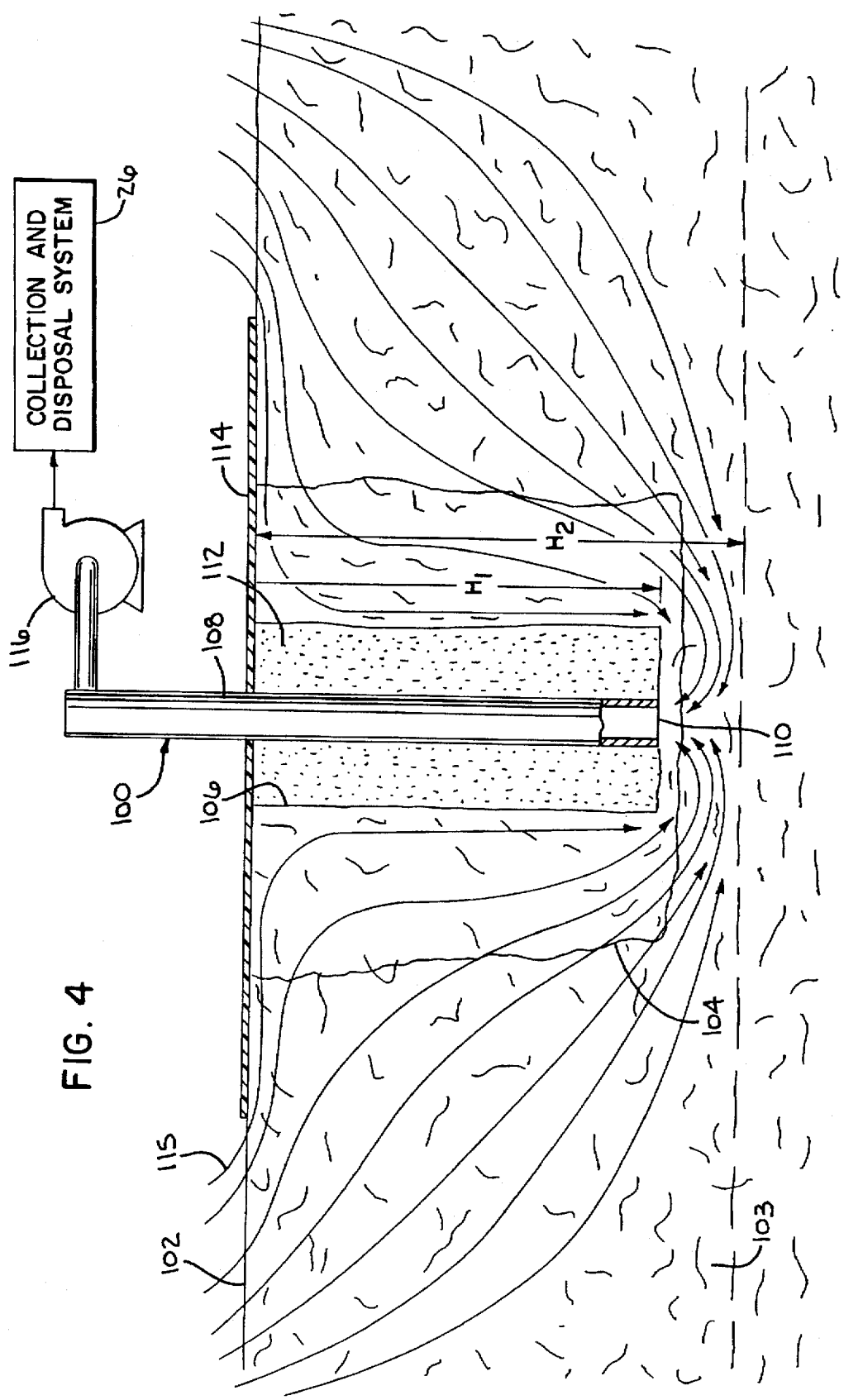
FIG. 4 is a sectional view of a first decontamination system embodying the present invention and having an extraction well which is open only at the bottom of the well.

A first embodiment of a portion of the present invention is shown in FIG. 4 wherein a vacuum extraction system 100, which provides controlled air flow paths, is shown. The vacuum extraction system 100 is positioned in the earth 102 and more particularly in a treatment region 104 of the earth which has soil contaminated with a volatile or semi-volatile contaminant. A well 106 is formed in the earth and a collection tube 108 is then placed in the well 106. The collection tube 108 is cylindrical and has a collection opening 110 at a bottom thereof. An impermeable packing material 112 surrounds the collection tube 108 and an impermeable membrane 114 extends approximately twice the width of the treatment region 104 so that the air flow 115 through the treatment region 104 caused by a vacuum pump 116 connected to the collection pipe 108 is substantially uniform over a major portion of the volume being treated. The air speed is roughly constant through the outer portions of the treatment region 104, with the exception of the portion of the treatment region 104 immediately adjacent the collection opening 110, the vacuum pump 116 is connected to the collection and disposal system 26 for removing contaminant vapor from the effluent stream comprising air, contaminant vapor and water from the treatment region 104. The controlled air flow avoids fingering and prevents pockets of untreated zones remaining in the treatment region 104.

Figure 5:
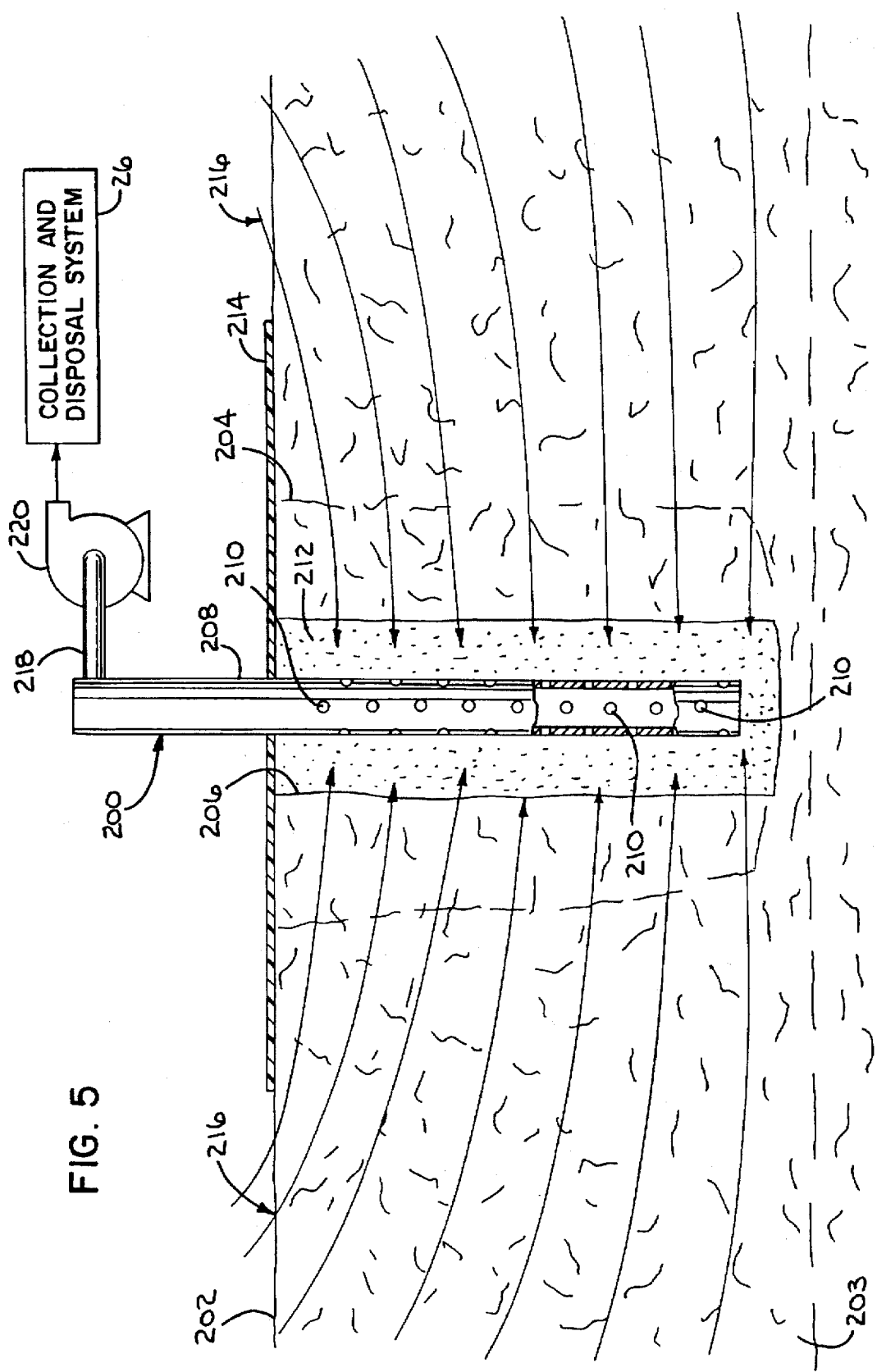
FIG. 5 is a sectional view of a second controlled flow vertical perforated vacuum extraction well embodying the present invention and placed in a contaminated site and drawing air therethrough to remove volatile contaminants from the site.

A second embodiment of the vacuum extraction portion of the instant invention is shown in FIG. 5 and includes a vacuum extraction system 200 comprising means for generating a controlled air flow through a treatment region. The vacuum extraction system 200 is placed partially in the ground 202 and more specifically in a vadose zone 203 thereof. For removal of a contaminant from a treatment region 204, the contaminant may be carbon tetrachloride, gasoline, jet fuel, kerosene, or the like. An extraction well 206 has an extraction tube 208 having a plurality of collection openings 210 formed therein positioned in a permeable material 212 such as sand. A membrane 214 abuts against the collection tube 210 of the well 206 and extends approximately twice the width of the treatment region 204 to cause air to flow via the controlled flow paths 216 at substantially constant velocity throughout a major portion of the the treatment region except in the immediate vicinity of the perforations 210 so that the entire treatment region is treated. A take-off tube 218 is connected to the tube 208. A vacuum pump 220 draws contaminant vapor, air and water vapor from the take-off tube 218 and by reducing the pressure in the well 206 causes the air to flow in through the ground surface 202a along the controlled flow substantially constant speed paths 216. The resulting effluent mixture is fed to the collection and disposal system 26.

Figure 6:
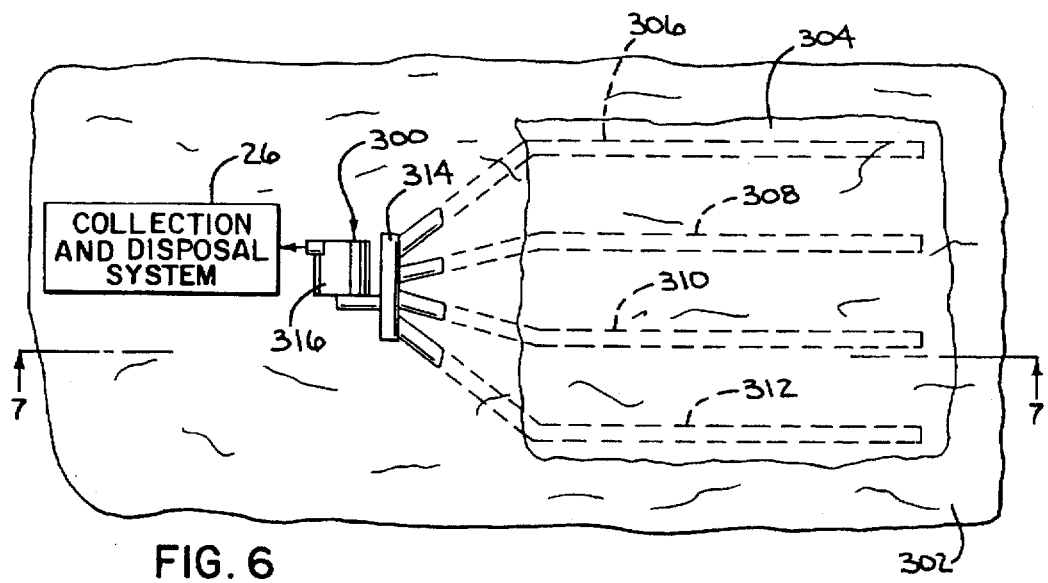
FIG. 6 is a top elevational view of a third decontamination system embodying the present invention and having multiple horizontal drains.
Figure 7:
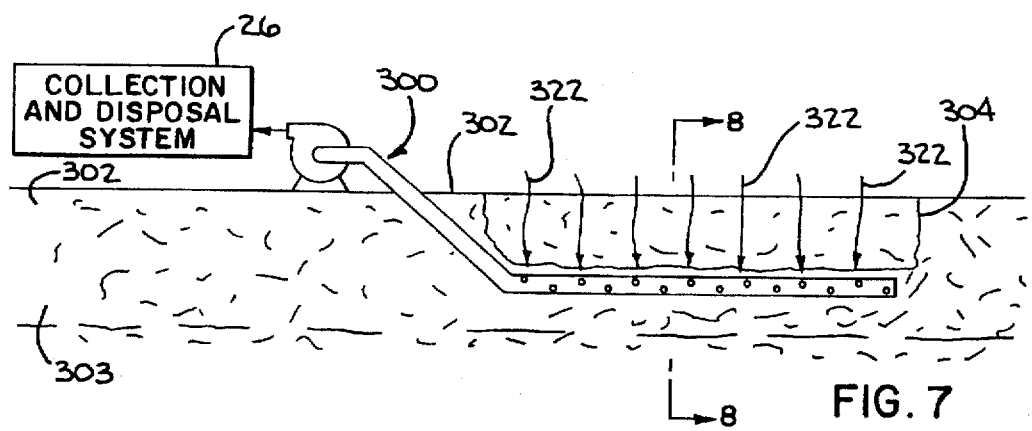
FIG. 7 is a sectional side view of the third decontamination system shown in FIG. 6.
Figure 8:
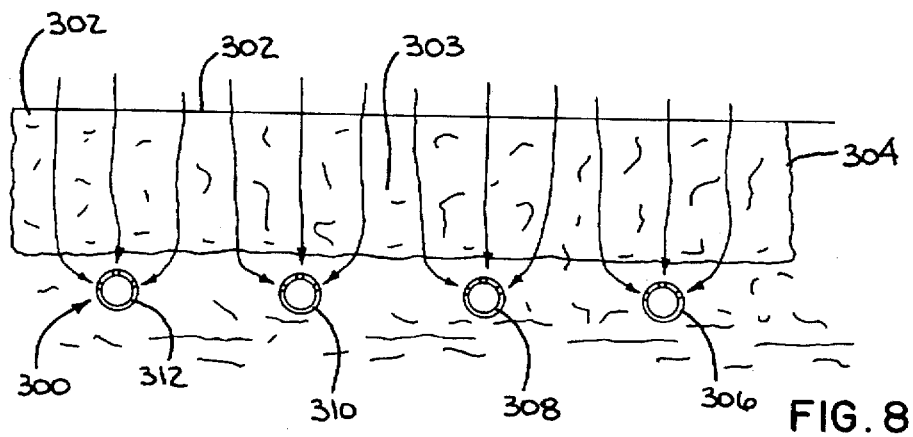
FIG. 8 is a sectional view of the third decontamination system shown in FIGS. 6 and 7 taken substantially along line 8—8 of FIG. 7.

A third embodiment of a controlled air flow system for performing vacuum extraction via controlled air flow is shown in FIGS. 6, 7 and 8. The system is generally identified by reference numeral 300 and has portions positioned in the ground 302, in particular, in a vadose zone 303 of the ground 302. A treatment region 304 in the ground 303 has a contaminant therein which is volatile or semi-volatile. A plurality of horizontal drain tubes 306, 308, 310 and 312 is positioned in the ground. The drain tubes are perforated and are connected to a manifold 314 connected to a vacuum pump 316 which draws a vacuum on the tubes 306, 308, 310 and 312. An effluent stream from the vacuum pump 316 is delivered to the collection and disposal system 26. It may be appreciated that when the vacuum is drawn, air flows in through the ground surface 302a along substantially vertically oriented paths 322. The air flow is at substantially a uniform speed through substantially the entire treatment region 304 with the exception of the portions of the treatment region 304 immediately adjacent the horizontal drain tubes 306, 308, 310 and 312. Thus, a controlled air flow is achieved which allows rapid and thorough treatment of the entire treatment region 304 without fingering which could leave volatile contaminants behind. It may be appreciated that because the drain tubes are positioned beneath the treatment region although the air flow curves in toward the drain pipes 306, 308, 310 and 312, nevertheless the air flows at substantially uniform speed through the treatment region 304.

A fourth embodiment of the present invention comprises the decontamination system 400 shown in FIGS. 9 and 10 and has portions in place in the earth 402 under its surface 402a and positioned in a vadose zone 403. A means for drawing a subatmospheric pressure in a nether collection region comprises a drain well 406 having a slanting tube 408 connected in communication with a perforated tube 410 which is positioned between the treatment region 404. The slanting tube 408 is connected to a vacuum pump 414. A packing material or well completion material 412 surrounds the slanting tube 408 to prevent bypassing of air along the slant line so that controlled air flow may take place when the vacuum is drawn by the pump 414. Effluent stream from the pump 414 is delivered to the collection and disposal system 26 connected thereto. An electrical heating means includes a power source 418, which in this embodiment may either be a source of 50 or 60 Hz electrical energy for conduction heating or a source of radio-frequency energy having a frequency between 6 and 13 megahertz for displacement current heating. The power source 418 is connected to an array of vertically positioned electrodes 420 having their major portions buried in the treatment region 404. A packing material 422 surrounds the electrodes and may comprise a mixture of brine and sand for good electrical conduction if the power source 418 is operating at 50 or 60 Hz. In operation, the power source 418 causes either a conduction or displacement current to flow between the two rows of electrodes thereby heating the soil in between while the vacuum is drawn. The vacuum causes air to flow along flow lines 424 through the ground surface 402 through the treatment region 404 and into the horizontal drain 410. The air flows at a substantially constant speed so that all portions of the treatment region 404 are being treated by the air flow and no portions will have contaminant remaining after treatment is completed. Since the system 400 uses electrical heating in combination with the controlled air flow vacuum extraction, semi-volatile materials such as jet fuel and the like may be easily removed.

A fifth embodiment of the present invention is shown in FIG. 11 and includes vacuum extraction means as well as electrical heating means. The vacuum extraction means of the system 500, which extends into the ground 502 through a ground surface 502a thereof, in contact with a treatment region 504, which is contaminated, includes a vacuum extraction well 506. The vacuum extraction well 506 has a central well metal member 510 having spaced pluralities of apertures 512 formed therein for receiving contaminant vapor. A vacuum line 514 is connected to the tube 510 and to a vacuum pump 516 which feeds effluent from the treatment region 504 to the collection and disposal system 26 connected to it. The electrical heating means includes a power source 520 which may either be a conduction current source or a displacement current radio-frequency source feeding electric power through a line 522 to the metal tube 510. The metal tube 510 includes a plurality of integrally formed circumferential air-impermeable annular rings 522 that contact the treatment zone 504 in good low resistance electrical contact. The air impermeability assures that air flow wil not deplete the moisture needed for ohmic contact with the deposit during conduction heating. This is to transfer electrical energy from the rings 522 to the treatment region 504 in order to heat the treatment region 504 either with displacement current or conduction current. The heating releases volatile and semi-volatile contaminants such as jet fuel from the treatment region 504. At the same time the vacuum system, including the vacuum pump 516, draws air, water, vapor and contaminated vapor through the extraction well 506 causing air to flow through the sides of the treatment region 504 because an impermeable membrane 526 is positioned above the treatment region extending past its boundaries. The air flow is best indicated by the flow lines 528.

Figure 12:
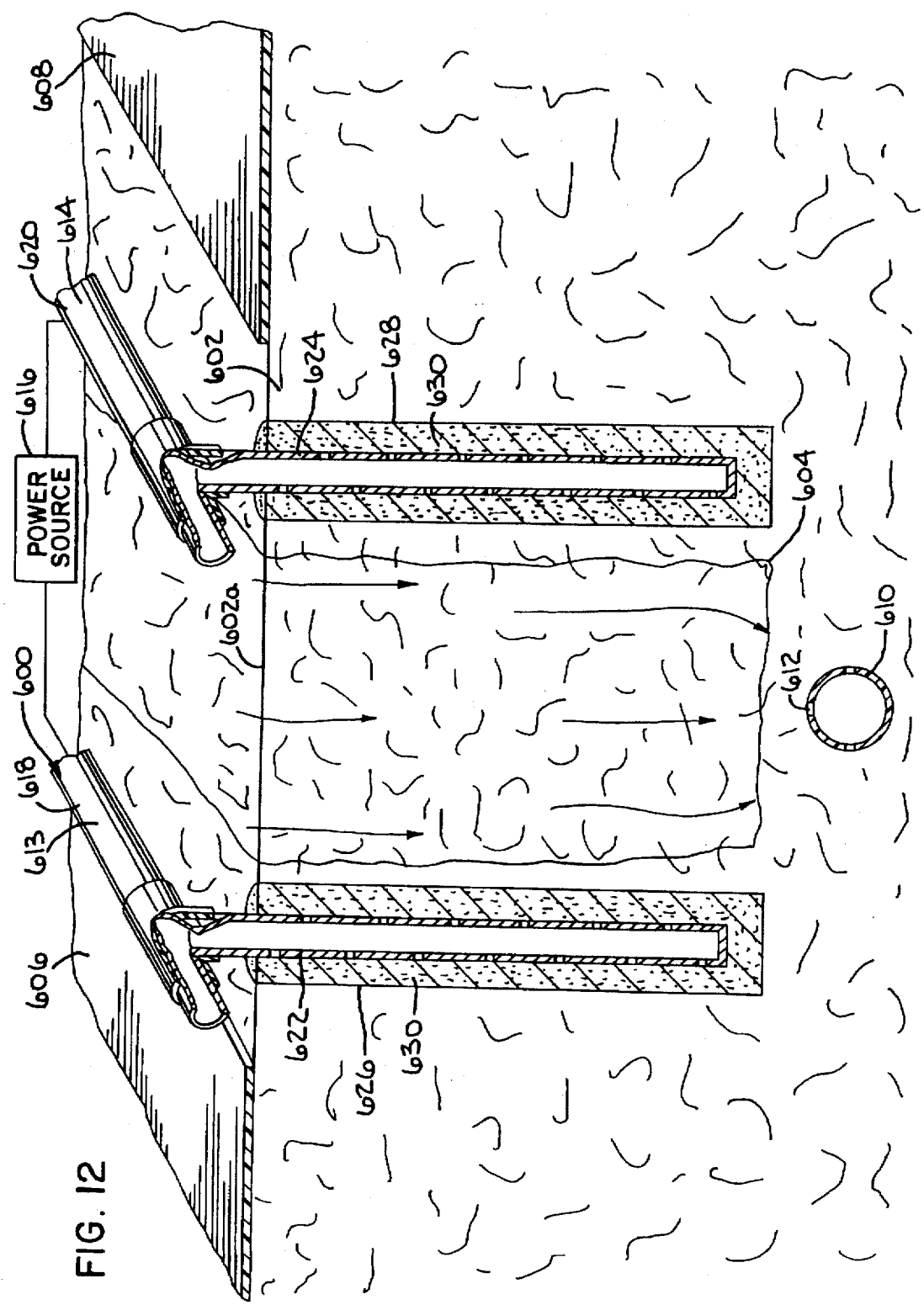
FIG. 12 is a perspective view, partially in section, of a sixth decontamination system embodying the present invention having vertical electrodes and a horizontal drain.

As may best be seen in FIG. 12 a sixth embodiment of the inventive decontamination system 600, is emplaced in the earth 602 with portions extending through a ground surface 602a. A treatment region 604 in the earth 602 is contaminated with a volatile or a semi-volatile organic contaminant such as kerosine, jet fuel, gasoline or the like. A first impermeable sheet 606 is positioned outside the treatment area, a second impermeable sheet 608 is positioned opposite the sheet 606 past the other side of the treatment area 604. A horizontal drain 610 is positioned beneath the treatment area and includes a plurality of vacuum extraction apertures 612. The horizontal drain 610 is connected to a vacuum pump which is in turn connected to the collection system 26 for extraction of effluent vapors. A first electrode assembly 612 has a portion positioned in the ground as does a second electrode assembly 614. A power source 616, which produces low frequency electrical energy typically having commercial frequencies of 50 or 60 Hz, energizes a horizontal tube 618 of electrode assembly 613 and a horizontal tube 620 of electrode assembly 614. The frequency range is not limited to commercial frequencies of 50 or 60 Hz but could be in any of the so-called power frequencies which can range from 1 Hz to 100 kHz. A vertical perforated tube 622 is connected to horizontal tube 618, a vertical perforated tube 624 is connected to horizontal tube 614. The perforated tubes are positioned respectively in well bores 626 and 628 and have a conductive material such as sand mixed with brine 630 positioned about them to place them in good electrical conduction with the ground 602 and the treatment region 604. Water or brine may be fed from an outside source through the tube 618 into the vertical tube 622 and likewise through the tube 620 into the vertical tube 624, a water exits the perforations in the vertical tubes 622, 624 to soak the sand 630 to ensure that it remains conductive even while electrical heating is occurring due to the conduction current flowing from the power source 616. In addition, the outer boundary impermeable sheath 606 and 608 block air flow from the sides causing all air flow through the treatment region to come straight through from the top at a substantially constant speed so that there is a substantially constant removal of contaminated vapor from the treatment region 604.

Figure 16:
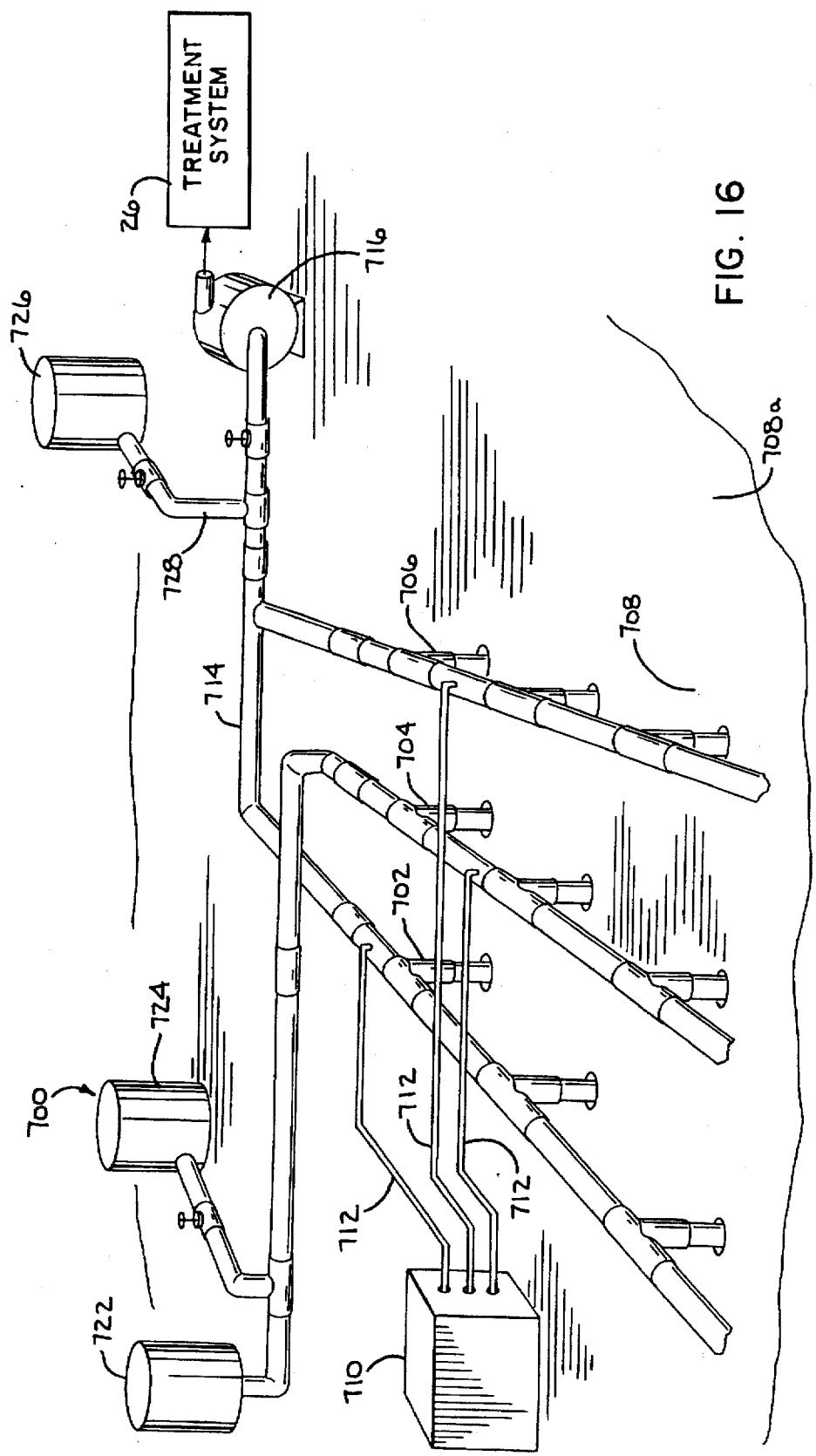
FIG. 16 is a perspective view of a portion of a seventh decontamination system embodying the present invention, including a vacuum extraction system having a plurality of vertical wells and an electrical heating system having a plurality of vertical electrodes for providing electric current to a contaminated region of the earth.

A seventh embodiment of the present invention is shown in a decontamination system 700 shown in FIG. 16. The decontamination system 700 includes three rows of vertical electrodes, respectively numbered 702, 704 and 706, which are positioned partially in ground 708 extending through a ground surface 708a. The rows of electrodes 702 and 706, as well as 704, are connected to a conduction current power source 710 which feeds power through a plurality of cables 712 to the rows of electrodes. Rows 702 and 706 comprise extraction well electrodes and are coupled via a vacuum line 714 to a vacuum pump 716 which is connected to the treatment system 26. All three rows of electrodes may be provided with brine or water in order to maintain the conductivity of the electrodes within the ground. The electrode row 704 is connected via a pipe 720 to a water tank 724. An air intake treatment tank 722 is used to remove dust particles which could clog the flow paths to provide a fugitive emission seal in the event of a shut down and to preheat the intake air if needed. A water tank 726 is connected via a line 728 to the pipe 714 to supply water to the electrodes of rows 702 and 706 to maintain conductivity.

As may best be seen in FIGS. 18, 19 and 20, an eighth decontamination system, generally identified by 800 and embodying the present invention, includes five rows of vertical electrodes positioned in ground 802. Three rows of vacuum extraction electrodes 804, 806 and 810 have interspersed in between them, air injection electrodes rows 812 and 814. A power source 816 has one of its sides connected to the air injection electrodes 812 and 814, the other side connected to the vacuum extraction electrode rows 804, 806 and 810 to provide an electric field which is substantially uniform throughout a treatment region 820. The electrode row 804 includes a header 830, the electrode row 806 includes a header 832, a header 834 is connected to the row 810, a header 836 is connected to the row 812, a header 838 is connected to the row 814. It is actually the headers which are connected to the power source 816. Headers 836 and 838 receive air which flows into the intake wells. The headers 830, 832 and 834 are connected to a vacuum manifold 840 which is connected to a vacuum pump 842, feeding effluent to the collection and disposal system 26. When the power source 816 energizes the electrodes with electrical energy at conduction current frequencies at 45 Hz to 60 Hz, a substantially uniform conductive current is established through the treatment region 820 to uniformly heat it. Likewise, the air flow is substantially uniform throughout the treatment region 820 and comprises a controlled flow having a substantially constant speed except in the immediate neighborhood of the air injection wells and extraction wells. This allows complete recovery of volatile and semi-volatile contaminants from the treatment region 820. Further, the air flow is well controlled by the use of the impermeable sheet 850, positioned over the entire treatment region 820 so that flow into the treatment region is restricted to the controlled flow through the air injection electrodes and the flow out of the treatment region is controlled solely by the extraction wells.

Figure 15:
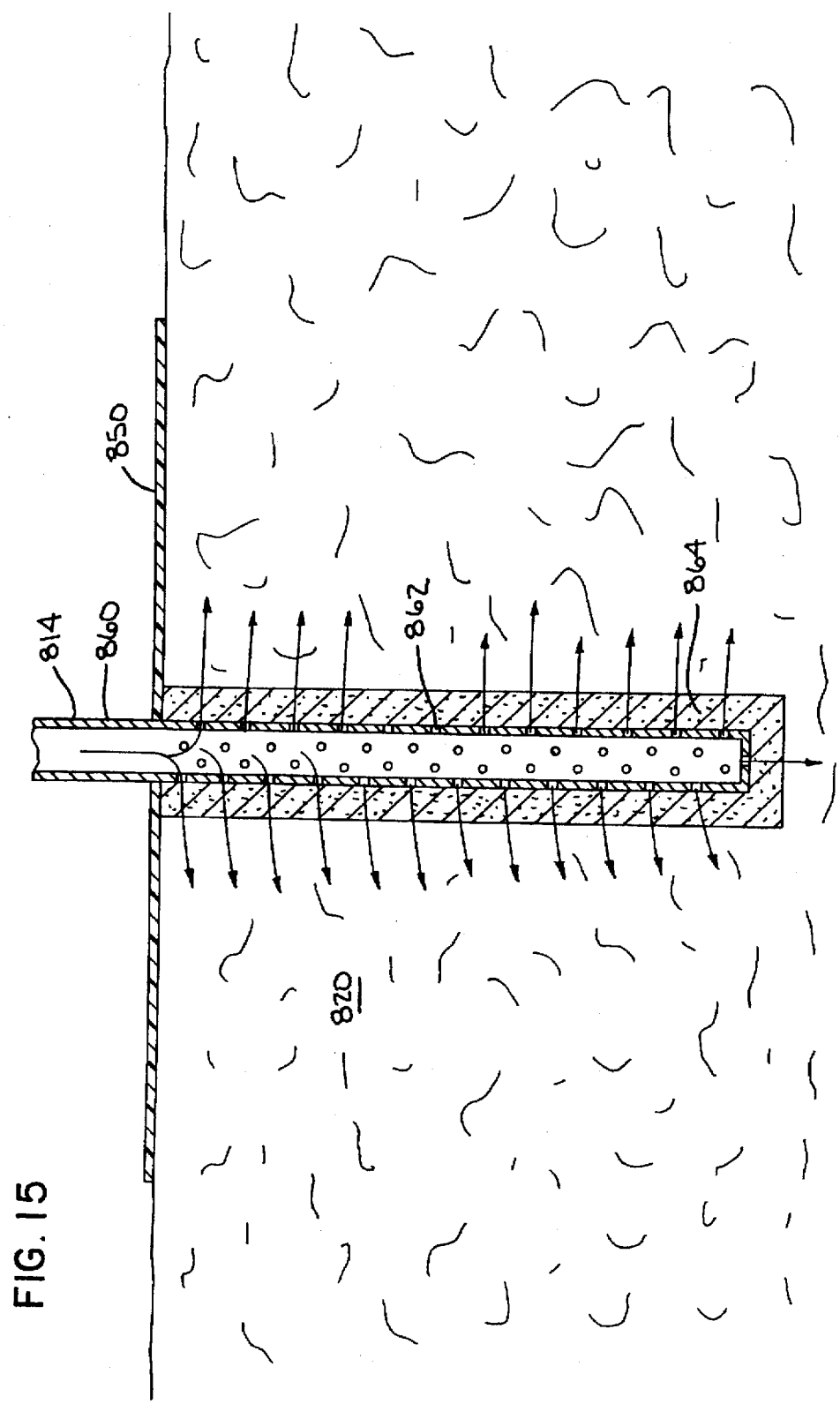
FIG. 15 is a sectional view of a portion of the eighth decontamination system embodying the present invention and having a vacuum extraction well extending through a gas impermeable barrier resting upon the ground above the contaminated region.

Further detail of one of the air injection wells is shown in FIG. 15 which shows the air injection well 814 with the impermeable sheet 850 positioned about portions of it, the impermeable sheet is cut-off and does not extend all the way across the picture. The well 814 includes a perforated tube 860 having a plurality of perforations 862 formed therein to release air into the treatment region 820. A loose, highly permeable packing material, such as loose sand 864 is packed around the tube 860 to allow the air to flow through easily.

Figure 14:
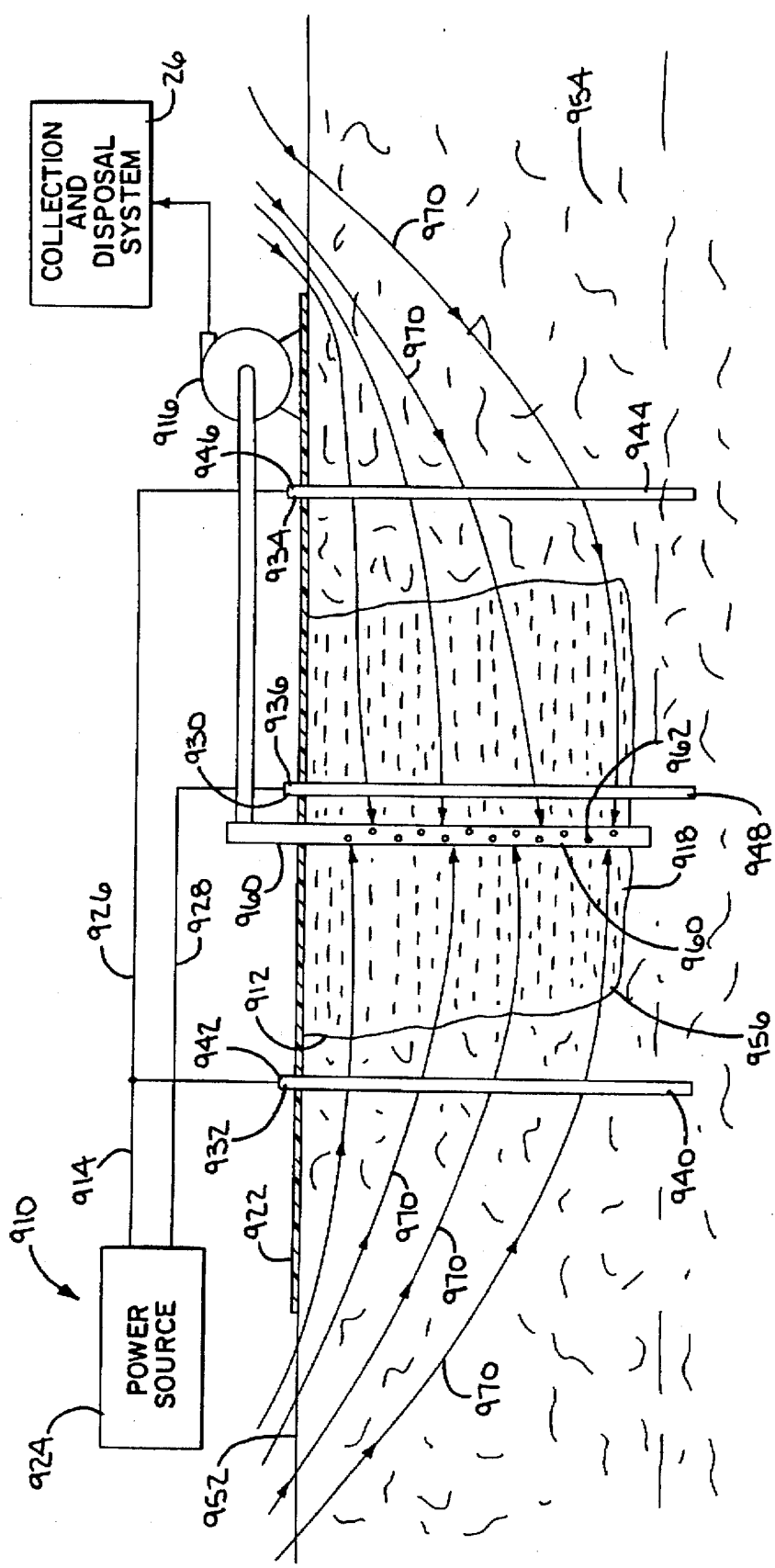
FIG. 14 is a sectional view of a ninth decontamination system embodying the present invention and having a vertical extraction well and a plurality of vertical electrodes.

Referring now to FIG. 14, a ninth decontamination system 910 embodying the present invention is shown therein for removing contaminants from a site 912 in the earth. The system 910 includes electric heating means 914 for electrically heating the site and a vacuum pump 916 for applying subsurface subatmospheric pressure to a zone 918 in a nether region of the site 912. The system 910 includes the collection and disposal system 26 for collecting contaminant vapor from an effluent stream received from the nether zone 918 and is connected to the pump 916. An impermeable sheet 922 for controlling the flow of air covers the site 912.

The heater for electrically heating 914 includes an alternating current generator 924 which produces electrical energy at a power-frequency of 50 or 60 Hz. The alternating current generator 924 feeds alternating current over lines 926 and 928 to a plurality of electrodes 932, 934, 936, which are partially buried in the site 912. The plurality of electrodes includes a first outside electrode 932, a second outside electrode 934 and a middle electrode 936. The outside electrodes 932 and 934 are held at ground potential while the middle electrode 936 is excited. It may be appreciated that the electrode 932 has a buried portion 940 and an above-ground portion 942, the electrode 934 has a buried portion 944 and an above-ground portion 946, and the electrode 936 has a buried portion 948 and an above-ground portion 950. The site 912 includes a site or ground surface 952, which is immediately above a vadose zone 954. Included within the vadose zone 954 is a contaminated region 956 in which the electrode 936 is partially buried. The electrodes 932 and 934 straddle the contaminated region 956 and are positioned slightly outside it. It may also be appreciated that the nether region 918 is immediately beneath the contaminated region 956.

The vacuum pump 916 is connected to a descending vacuum line 960, partially buried in the site 912. The descending line 960 having a plurality of apertures 962. When energized, the vacuum pump 916 reduces the pressure in the nether region 918 to a subatmospheric pressure, causing air to be drawn in from the ground 952 around the site 912. At the same time, electrical energy is supplied by the generator 924 to the plurality of electrodes 932, 934, 936, heating the contaminated region 956, which may contain light or heavy hydrocarbons such as kerosene therein. Due to the heating of the region 956, the contaminants are partially vaporized and are carried by an air stream 970 into the collection openings 962. In order to assure a complete air sweep through the contaminated region 956 without fingering or channelling, the impermeable sheet 922, such as a plastic sheet, is provided. The sheet 922 extends laterally for a distance twice the maximum depth of the contaminated region 956 to allow adequate controlled air flow through the region 956 in order to trap and entrain the vapor therein. The sheet 922 also prevents evaporation of water on the electrodes to prevent loss of conduction. The collected mixture of air, water vapor, and contaminant vapor is fed to the collection and disposal system 26.

Figure 22:
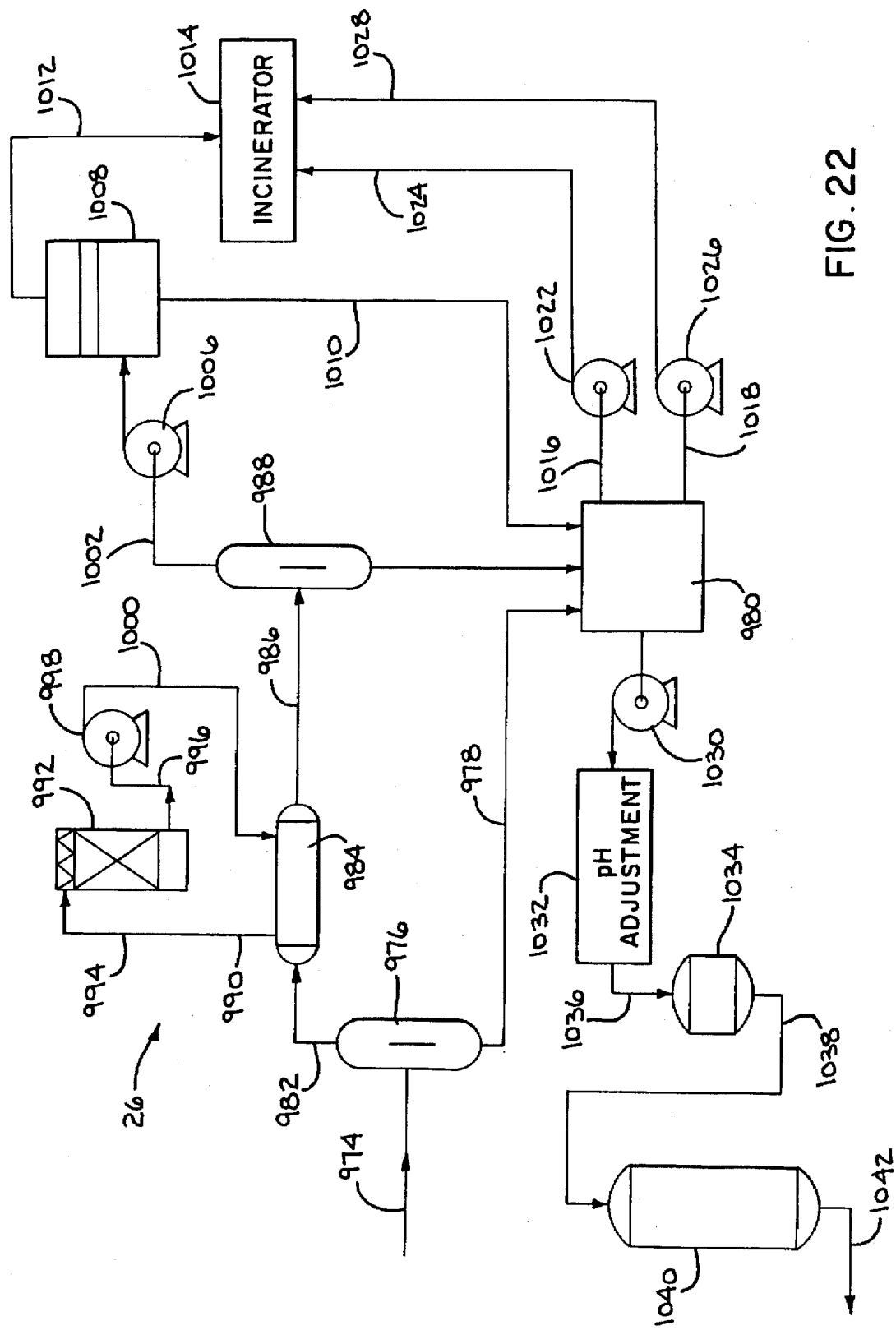
FIG. 22 is a block diagram of an effluent disposal and treatment system of the aforementioned decontamination systems connectable to a vacuum pump to receive and treat an effluent stream comprising air, water vapor and contaminant liquid and vapor drawn from the contaminated region.

The collection and disposal system 26 is shown in FIG. 22 and is of conventional design. A gas-liquid separator 976 is connected to the line 974 and receives the fluid stream therefrom. Separated liquids are fed via a line 978 to a liquid-liquid separator 980. Separated gases are fed via a line 982 to a condenser-cooler 984 where heat is removed from the fluid stream, allowing some of the vapors to condense. The cooled vapors are output, along with the liquid, via a line 986 to a gas-liquid separator 988. In order to ensure adequate cooling, a cooling loop 990 is provided having a cooling tower 992 connected to an input line 994 from the condenser-cooler 984. The cooling tower transfers heat from a water stream to the atmosphere, and cooled water is fed from the cooling tower through a line 996 to a pump 998 and thence through a line 1000 to the condenser-cooler 984.

The gas-liquid separator 988 has an output gas line 1002 and a liquid line 1004 connected thereto. The gas line communicates with a fan 1006, the output of which is connected to a demister 1008. The line 1004 supplies liquid to the liquid-liquid separator 980 as does an output line 1010 from the demister 1008. Gases from the demister 1008 are fed via a line 1012 to a catalytic incinerator 1014 used for non-chlorinated contaminant. When chlorinated contaminant is to be treated a chiller and associated carbon bed adsorber are substituted for the catalytic incinerator 1014. The liquid-liquid separator 980 has an output light organic phase line 1016, an output heavy organic phase line 1018, and an output water line 1020 connected thereto. A light organic phase pump 1022 feeds the light organic phase material from the line 1016 through a light organic phase line 1024 to the incinerator 1014, delivering waste light organic compounds, such as hexane and heptane, to the incinerator 1014. A heavy organic phase pump 1026 feeds material from the line 1018 through a heavy organic phase line 1028 to the incinerator 1014 for feeding heavier organic compounds such as kerosene recovered from the site contaminated region to the incinerator 1014 where they are oxidized. Water from the contaminated region is fed by a line 1020 to a pump 1030 which delivers the water to a pH adjuster 1032 for neutralizing any acidity in the water. The water is then filtered by a pressure filter 1034 connected to a line 1036 between the pH adjustor 1032 and the pressure filter 1034. An output line 1038 from the pressure filter 1034 supplies pH 7.0 filtered water to a carbon bed absorber 1040 which removes any remaining contaminants filtered water to generate a treated water stream in an output line 1042 for use in other portions of the equipment.

Figure 13:
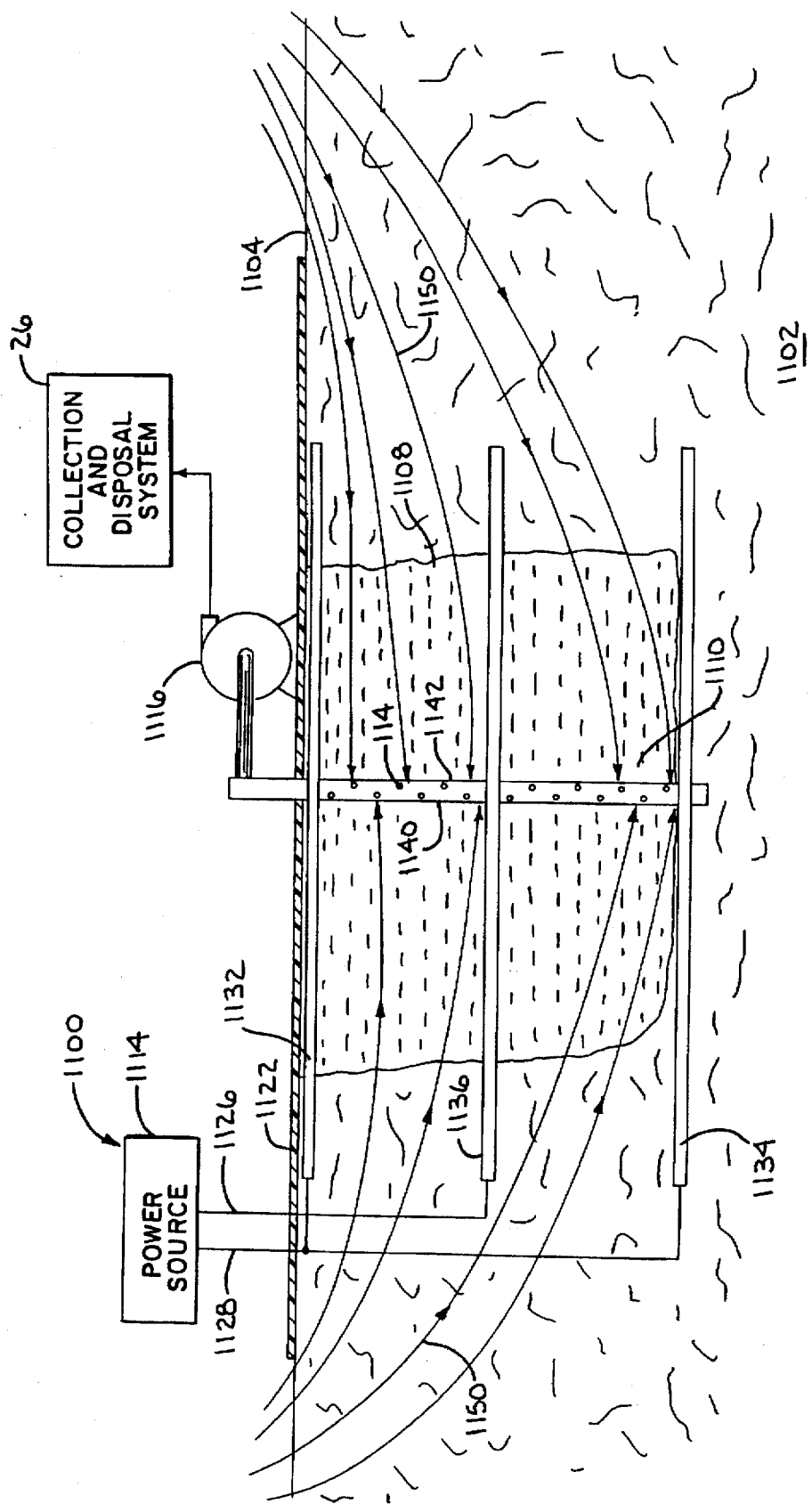
FIG. 13 is a sectional view of a a tenth decontamination system embodying the present invention and having a vertical extraction well and horizontal electrodes.

Referring now to FIG. 13, a tenth embodiment of the aforementioned invention is shown therein including an apparatus 1100 for removing volatile contaminants. The apparatus 1100 is positioned at a site 1102, having a surface 1104, and a contaminated region 1108. There is a nether region 1110 of the contaminated region 208. The contaminated region 1108 contains volatile hydrocarbon contaminants, such as kerosene, which must be removed. The collection and disposal system 26 includes a heating system 1114 for electrically heating the site and a vacuum pump 1116 for creating a subatmospheric pressure zone in the nether region 1110. The collection and disposal system 26 is connected to the pump 1116. There also is a sheet 1102 for controlling the flow of air through the site 1102 in order to reduce changes in the electrical properties of the site 1102 due to evaporation of water therefrom.

The electrical heating system 1114 includes a power source 1124 of 50 or 60 Hz electrical energy connected to lines 1126 and 1128. The line 1128 is connected to a pair of horizontal electrodes 1132 and 1134. A horizontal electrode 1136, positioned between electrodes 1132 and 1134, is connected to the line 1126. It may be appreciated that the electrodes define an electrical heating region of size substantially the same as or greater than that of the treatment region 1108.

The pump 1116 is connected to a vertical vacuum extraction line 1140 having a plurality of holes 1142 formed therein in the nether region 1110. Vacuum pump 216 feeds a contaminant line connected to the collection and disposal system 26. Electrical energy from the alternating current source 1124 causes electrical conduction current to flow through the contaminated region 1108 resulting in the region's being heated, thereby increasing the vapor pressures of contaminants therein. Simultaneously, air is swept through the contaminated region 1108 from the surface 1104 but not through portions of the surface 1104 lying underneath the sheet 1122. The air follows a flow path 1150, which causes it to stream through the contaminated region 1108, picking up contaminant vapors therein and carrying them with the air into the collection line 1140 where they are pumped out by the vacuum pump 1116 and delivered to the collection and disposal system 26. The region of greatest pressure differential for the air flow, it may be appreciated, is spaced from the greater part of the horizontal electrodes 1132, 1134, 1136 so that substantial evaporation of water in the region of the horizontal electrodes does not take place, as it would interrupt flow of the conduction current and heating of the contaminated region 1108. It may also be appreciated that only a current sufficient to heat the contaminated region 1108 to a temperature below the boiling point of water is provided in order to ensure that the vapor generated by the heating is vented solely through the line 1140 for later collection and disposal as set forth above.

Figure 17:
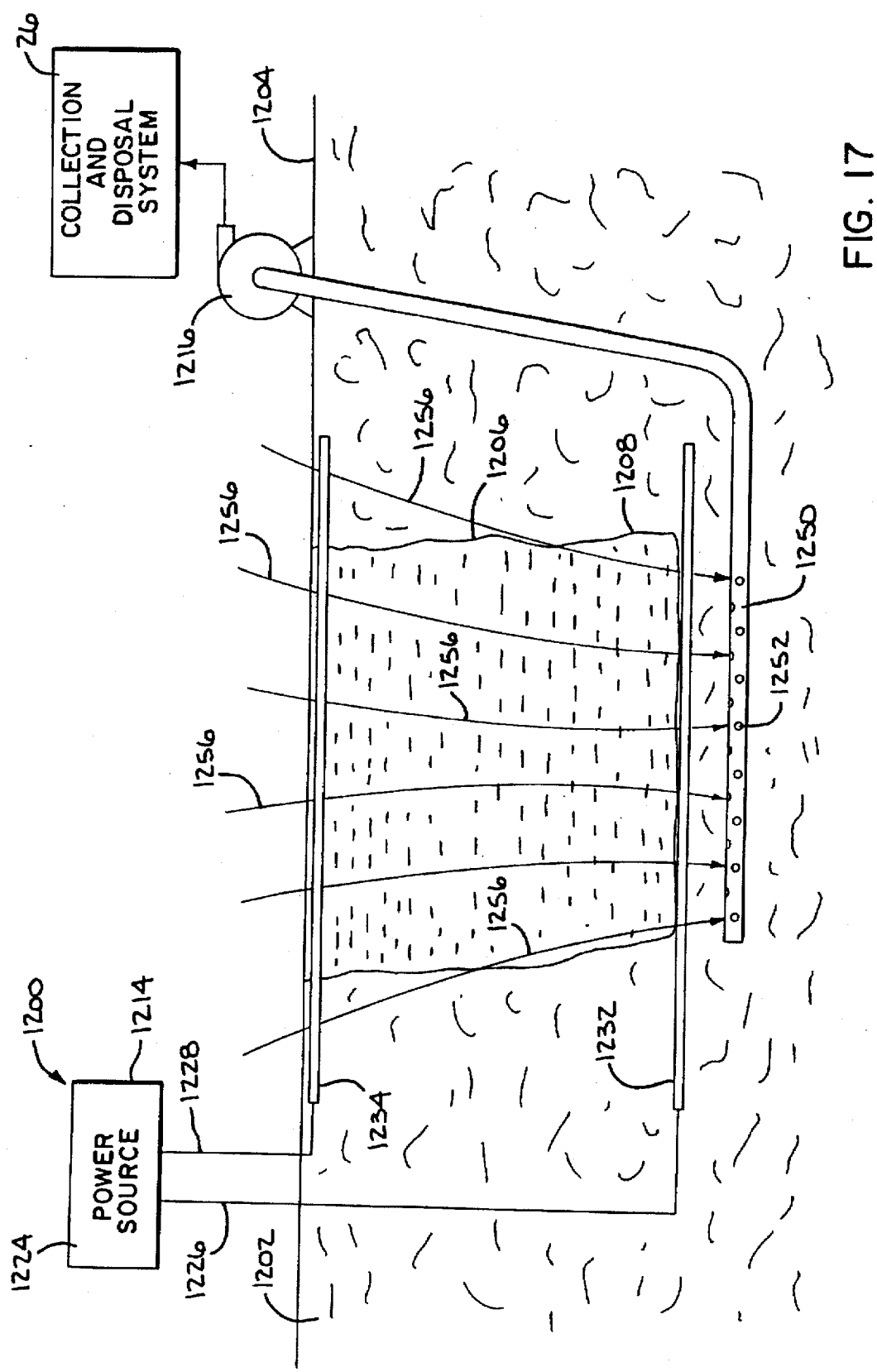
FIG. 17 is a sectional schematic view of an eleventh decontamination system embodying the present invention, similar to that shown in FIGS. 9 and 10, including a pair of horizontal electrodes and a horizontal extraction well.

In an eleventh embodiment, as may best be seen in FIG. 17, an apparatus 1200 for decontaminating a site 1202 is provided. The site 1202 includes a site surface 1204 and a contaminated region 1206 having a nether region 1208. The site 1202 is a portion of earth which has been contaminated with kerosene or the like, which may have been caused by leaks or spills. There also is provided a heating system 1214 for electrically heating the contaminated region 1206 and a vacuum pump 1216 for reducing to subatmospheric the pressure the nether region 1208. The system 26 for collecting the contaminant vapor is connected to the pump 1216.

The electrical heating system 1214 includes a source of electrical energy 1224, which generates 50 or 60 Hz alternating current supplied to lines 1226 and 1228, electrically connected to a first horizontal electrode 1232, a second vertical electrode 1234. A horizontal collection pipe 1250, having a plurality of holes 1252, extends beneath the treatment region 1208. The collection pipe 1250 is connected to the vacuum pump 1216 to deliver effluent contaminant, water vapor, and air to the collection and disposal system 26 provides constant speed controlled air flow along lines 1256 as set forth above.

Figure 21:
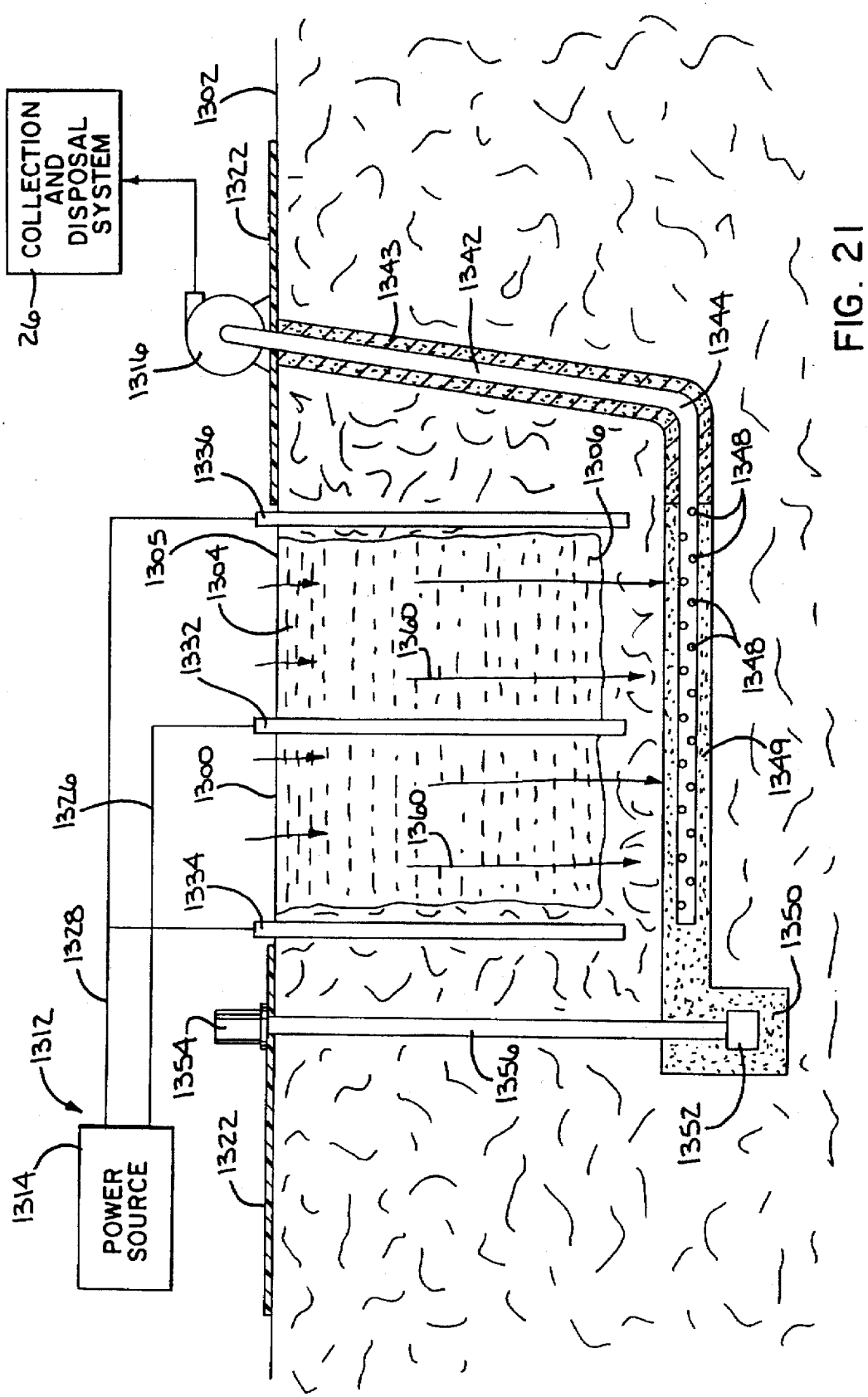
FIG. 21 is a sectional schematic view of a twelfth decontamination system embodying the present invention having vertical electrodes and a horizontal extraction well.

As shown in FIG. 21, a site 1300 in the earth having a ground or earth surface 1302 has a contaminated region 1304, a surface 1305, and a nether collection region 1306. A twelfth system 1312 for decontaminating the site 1300 includes an electrical heating system 1314 for electrically heating the site and a vacuum pump 1316 for reducing the pressure of the nether region 1306 to a subatmospheric pressure level. The collection and disposal system 26 receives the output of the pump 1316. A pair of impermeable sheets 13 and 1323 extends outside the contaminated region 1304.

The electrical heating system 1314 includes a source 1324 of 50 or 60 Hz electrical energy supplied to a pair of lines 1326 and 1328. A plurality of vertical electrodes 1332, 1334, 1336 are connected to the lines 1326 and 1328 to receive electrical energy in the form of electric current therefrom. The line 1326 is connected to the center electrode 1332, and the line 1328 is connected to the outside electrodes 1334 and 1336. Electrodes 1334 and 1332 extend outside and adjacent to the contaminated region 1304 to define a conductive field region therein.

The vacuum pump 1316 is connected by a downwardly extending vacuum line 1342 positioned in impermeable material 1343 to an elbow 1344 in turn connected to a horizontal line 1346, having a plurality of openings 1348 formed therein, positioned permeable material 1349 in communication with a sump 1350 having a liquid pump 1352 and a pump drive 1354 with a liquid removing lines 1356 in the nether region 1306 of the site 1302, immediately below the contaminated region 1304. In operation, electrical energy generated by the generator 1324 causes conduction current to flow between the electrode 1332 and the electrodes 1334 and 1336, causing the contaminated region 1304 to be heated, increasing the vapor pressure of contaminants therein, and at least partially converting the contaminants to vapors. Simultaneously, the vacuum pump 1316 is energized, reducing the pressure in the nether region 1306, causing air to be drawn in from the surface 1302 in a controlled constant speed flow 1360, except where bounded by the impermeable sheets 1322. The air sweeps through the contaminated region 1304 and into the collection holes 1348 whence it is drawn up the pipe 1346 through the elbow 1344 and the pipe 1342 by the vacuum pump 1316 and delivers the effluent mixture of air, contaminant vapor and water vapor to the collection and disposal system 26. It may be appreciated that the controlled flow does not concentrate the air flow immediately adjacent the electrodes 1330, thereby helping to limit the evaporation of water around the electrodes and consequent reduction in conduction therefrom.

It may be appreciated that the present system provides an economical method for removing heavy fraction contaminants from a contaminated site. The system uses a combination of electrical heating and pressure reduction combined with substantially uniform speed controlled air flow to effect the removal. The air flow is controlled so that relatively limited portions of the water at the site are evaporated to prevent loss of electrical conduction at the site. Thus, relatively inexpensive electrical generators producing electrical current having a frequency of 50 Hz or 60 Hz may be used rather than more expensive radio frequency generators used for dielectric heating. The electrical heating increases the vapor pressures of the heavy fraction contaminants, more easily vaporizing them. The vaporization is assisted by the vaporization of a portion of the water in the site because the heated water vapor helps to strip the contaminants from the earth. The freed contaminant vapor is then carried by the air stream into the collection region where it is drawn off through the vacuum line and subsequently disposed of.

While there have been illustrated and described particular embodiments of the present invention, it will be appreciated that numerous changes and modifications will occur to those skilled in the art which fall within the true spirit and scope of the present invention.

What is claimed is:

1. A method of removing a contaminant from a contaminated region of the earth containing water, comprising:

contacting a portion of a treatment region with an electrically conductive matrix;

heating the treatment region of the contaminated region of the earth to a temperature below the normal boiling point of water by a substantially spatially uniform and continuous conduction frequency electric field applied to the electrically conductive matrix and extending through the treatment region, the electric field causing an alternating conduction frequency electric current to flow through the treatment region without arcing so that at least a portion of the contaminant becomes vapor at a temperature below the boiling point of water;

blocking a portion of a surface of the earth above the treatment region to prevent air from flowing nonuniformly into the treatment region; and establishing a collection region from an auxiliary well at subatmospheric pressure within or below the treatment region for drawing in ambient air and moving it at a substantially constant speed into substantially all of the treatment region from the surface of the earth so as to transport the volatile contaminant to the auxiliary well at the collection region.

2. A method of removing a contaminant from a contaminated region of the earth containing water according to claim 1, wherein the electric current comprises a conduction current.

3. A method of removing a contaminant from a contaminated region of the earth containing water according to claim 2, further comprising the step of further heating the treatment region to a temperature above the boiling point of water by the substantially spatially uniform and continuous electric field extending through the treatment region, the substantially spatially uniform and continuous electric field causing a displacement current to flow through the treatment region to increase the vapor pressure of the contaminant so that at least a portion of the contaminant becomes vapor at a temperature above the boiling point of water.

4. A method of removing a contaminant from a contaminated region of the earth containing water according to claim 1, wherein the treatment region of the earth is heated by electrical energy having a frequency ranging from 1 Hz to 100 kHz.

5. A method of removing a contaminant from a contaminated region of the earth containing water according to claim 1, wherein the step of contacting further comprises injecting water into portions of the treatment region where there is high electrical resistance to assure the electrical conduction heating therein.

6. A method of removing an organic contaminant from a contaminated region of the earth containing water comprising:

applying a spatially uniform continuous alternating current conduction frequency electric current to an electrically conductive matrix in electrical contact with a treatment region of the contaminated region of the earth for alternating current electrical conduction heating without arcing using an electrode having a portion buried in the earth and in electrical contact with the conductive matrix to evaporate a portion of the water at a temperature below the normal boiling point of water and to evaporate at least a portion of said contaminant;

blocking a portion of a surface of the earth above the treatment region to prevent air from flowing nonuniformly into the treatment region; and applying subatmospheric pressure to a nether collection region via an auxiliary well disposed away from the electrode to draw in ambient air through the treatment region from the surface of the earth without so drying the earth in proximity to the electrode as would substantially interrupt the electrical conduction heating and to collect the water vapor and at the same time the contaminant vapor in the nether collection region.

7. A method of removing an organic contaminant from a contaminated region of the earth containing water according to claim 6, wherein the treatment region of the earth is heated by electrical energy having a frequency ranging from 1 Hz to 100 kHz.

8. A method of removing an organic contaminant from a contaminated region of the earth containing water according to claim 6, wherein the electrical conduction heating is carried out by electrical currents having a frequency ranging from 1 Hz to 100 kHz.

9. A method of removing an organic contaminant from a contaminated region of the earth containing water according to claim 7, further comprising the step of injecting water into portions of the treatment region where there is high electrical conduction heating to assure the electrical conduction heating therein.

10. Apparatus for removing a contaminant from a contaminated region of the earth containing water, comprising:

an electrically conducting matrix in electrical contact with a treatment region of the contaminated region;

electrical heating means coupled to the electrically conducting matrix, for heating a treatment region of the contaminated region of the earth by electrical conduction heating produced from a substantially uniform and continuous alternating current conduction frequency electric field without arcing to increase the vapor pressure of the contaminant so that at least a portion of the contaminant becomes vapor at a temperature below the normal boiling point of water;

an air impermeable sheet resting on the earth above the treatment region for blocking a portion of a surface of the earth above the treatment region to prevent air from flowing nonuniformly into the treatment region; and vacuum means comprising an auxiliary well, for establishing a region of subatmospheric pressure within or below the treatment region for drawing in ambient air and moving it from the surface of the earth over a controlled flow path through the treatment region so as to transport the contaminant to the collection region in an air-vapor mixture having a high ratio of vapor to air.

11. Apparatus for removing a contaminant from a contaminated region of the earth containing water according to claim 10, wherein said means for heating further comprises an electrode having a conduction area in electrical contact with the earth to deliver electrical current to the treatment region.

12. Apparatus for removing a contaminant from a contaminated region of the earth containing water according to claim 11, wherein said heating means includes a plurality of electrodes substantially arranged in three rows with a center row and two outer rows, the center row acting as an exciter.

13. Apparatus for removing a contaminant from a contaminated region of the earth containing water according to claim 11, wherein said vacuum means comprises a vacuum pump.

14. Apparatus for removing a contaminant from a contaminated region of the earth containing water according to claim 10, wherein said vacuum means further comprises a vacuum head positioned proximate the subatmospheric pressure region.

15. Apparatus for removing a contaminant from a contaminated region of the earth containing water according to claim 10, further comprising means for processing the contaminant vapor collected by the vacuum means.

16. Apparatus for removing a contaminant from a contaminated region of the earth, comprising:

electrical heating means for heating the contaminated region of the earth by electrical displacement current heating produced from a substantially spatially uniform and continuous alternating current conduction frequency electric field without arcing above the boiling point of water to increase the vapor pressure of the contaminant so that at least a portion of the contaminant becomes vapor at a temperature above the boiling point of water;

an air impermeable sheet resting on the earth above the treatment region for blocking a portion of a surface of the earth above the treatment region to prevent air from flowing nonuniformly into the treatment region; and vacuum means comprising an auxiliary well, for establishing a region of subatmospheric pressure within or below the contaminated region for drawing in ambient air and moving it at a substantially constant speed from the surface of the earth over a controlled flow path through the contaminated region so as to transport the contaminant to the auxiliary well of the collection region in an air-vapor mixture having a high ratio of vapor to air.

17. Apparatus for removing a contaminant from a contaminated region of the earth containing water according to claim 16, wherein said heating means comprises a plurality of electrodes substantially arranged in three rows with a center row and two outer rows, the center row acting as an exciter.

18. Apparatus for removing a contaminant from a contaminated region of the earth containing water according to claim 17, wherein said vacuum means comprises a vacuum pump.

19. Apparatus for removing a contaminant from a contaminated region of the earth containing water according to claim 16, wherein said vacuum means further comprises a vacuum head positioned proximate the subatmospheric pressure region.

20. Apparatus for removing a contaminant from a contaminated region of the earth containing water according to claim 16, further comprising means for processing the contaminant vapor collected by said vacuum means.

* * * * *